United States Patent
Zheng

(10) Patent No.: US 10,630,387 B2
(45) Date of Patent: Apr. 21, 2020

(54) METHOD FOR ESTABLISHING VIRTUAL ACCESS NODE IN OPTICAL ACCESS NETWORK AND DEVICE

(71) Applicant: HUAWEI TECHNOLOGIES CO., LTD., Shenzhen, Guangdong (CN)

(72) Inventor: Ruobin Zheng, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/021,405

(22) Filed: Jun. 28, 2018

(65) Prior Publication Data
US 2018/0309517 A1 Oct. 25, 2018

Related U.S. Application Data

(63) Continuation of application No. PCT/CN2016/109931, filed on Dec. 14, 2016.

(30) Foreign Application Priority Data

Dec. 28, 2015 (CN) .......................... 2015 1 1006124

(51) Int. Cl.
*H04B 10/27* (2013.01)
*H04L 29/06* (2006.01)
(Continued)

(52) U.S. Cl.
CPC ......... *H04B 10/27* (2013.01); *H04L 12/4633* (2013.01); *H04L 12/4641* (2013.01);
(Continued)

(58) Field of Classification Search
CPC .. H04L 12/4641; H04L 41/12; H04L 41/0806
See application file for complete search history.

(56) References Cited

U.S. PATENT DOCUMENTS 8,320,760 B1 * 11/2012 Lam .................... H04J 14/0257
398/66
2009/0141702 A1 * 6/2009 Kuo ....................... H04L 47/10
370/351
(Continued)

FOREIGN PATENT DOCUMENTS

CN 101499951 A 8/2009
CN 103428061 A 12/2013
(Continued)

OTHER PUBLICATIONS

Jie Li et al. Dynamic Power Management at the Access Node and Customer Premises in Point-to-Point and Time-Division Optical Access. IEEE Journal on Selected Areas in Communications, vol. 32, No. 8, Aug. 2014. pp. 1575-1584.
(Continued)

*Primary Examiner* — Ayaz R Sheikh
*Assistant Examiner* — Debebe A Asefa
(74) *Attorney, Agent, or Firm* — Womble Bond Dickinson (US) LLP

(57) ABSTRACT

Embodiments of a method for establishing a virtual access node in an optical access network and a device are disclosed. An identifier of a virtual line corresponding to a physical line is obtained by an access device in a first network after receiving a first message from a user equipment. The physical line is a physical line between the user equipment and a physical access node AN in the first network. The virtual line is a logical line between the user equipment and a virtual AN. Configuration information is obtained by the access device from a configuration server in a second network according to the identifier of the virtual line. The configuration information is used to create the virtual AN. The virtual AN is created by the access device according to the configuration information.

11 Claims, 17 Drawing Sheets

(51) Int. Cl.
*H04L 12/46* (2006.01)
*H04L 12/24* (2006.01)
*H04L 29/12* (2006.01)
*H04Q 11/00* (2006.01)

(52) U.S. Cl.
CPC .......... *H04L 29/06* (2013.01); *H04L 41/0893* (2013.01); *H04L 61/2015* (2013.01); *H04L 63/0892* (2013.01); *H04Q 11/0067* (2013.01)

(56) References Cited

U.S. PATENT DOCUMENTS

| | | |
|---|---|---|
| 2015/0188812 A1 | 7/2015 | Zheng et al. |
| 2015/0200849 A1 | 7/2015 | Wen et al. |
| 2016/0261556 A1 | 9/2016 | Zheng |
| 2017/0093623 A1 | 3/2017 | Zheng |

FOREIGN PATENT DOCUMENTS

| | | |
|---|---|---|
| CN | 103686466 A | 3/2014 |
| CN | 103856449 A | 6/2014 |
| CN | 104144096 A | 11/2014 |
| CN | 104639413 A | 5/2015 |
| WO | 2014049432 A3 | 5/2014 |
| WO | 2015188689 A1 | 12/2015 |

OTHER PUBLICATIONS

SD-351 Stage 1 Analysis of Fixed Access Network Sharing, Issue: 01, The Broadband Forum, Jun. 2015, 63 pages.

\* cited by examiner

```
                    ┌─ 41
A configuration server in a second network obtains configuration information
according to an identifier of a virtual line, where the virtual line is a logical line
between user equipment and a virtual access node AN, and the configuration
                  information is used to create the virtual AN │
                              ▼
                    ┌─ 42
The configuration server sends the configuration information to an access device in a
                              first network
```

FIG. 3

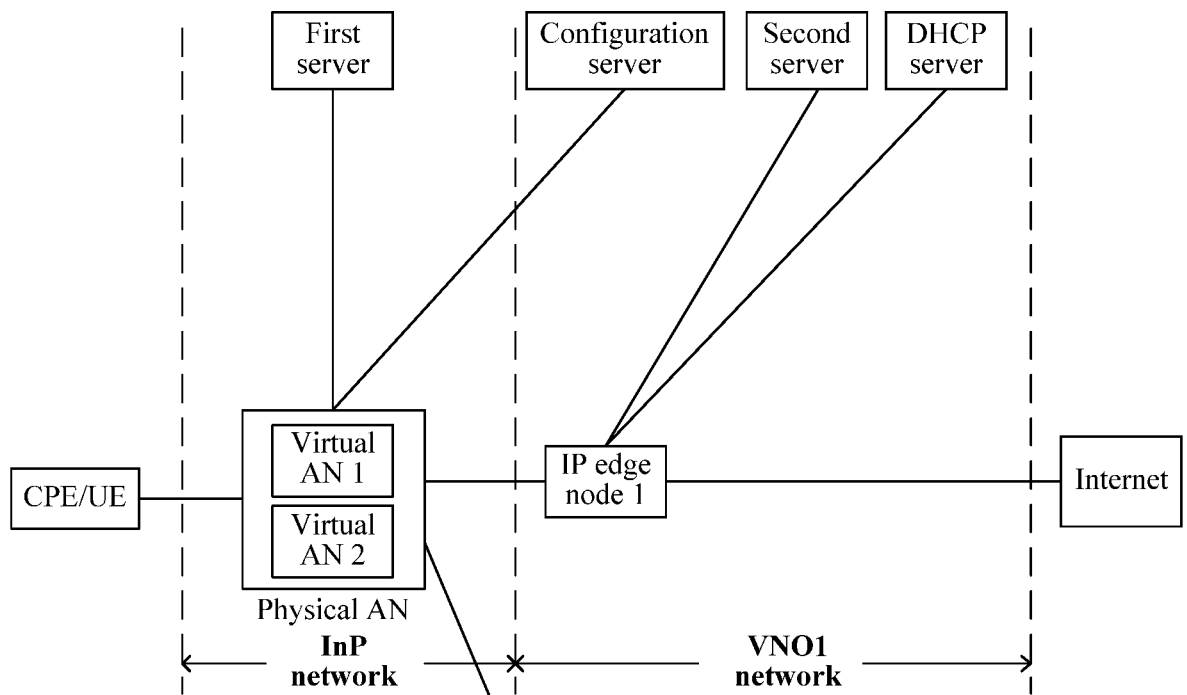

FIG. 4

METHOD FOR ESTABLISHING VIRTUAL ACCESS NODE IN OPTICAL ACCESS NETWORK AND DEVICE

CROSS-REFERENCE TO RELATED APPLICATIONS

This application is a continuation of International Application No. PCT/CN2016/109931, filed on Dec. 14, 2016, which claims priority to Chinese Patent Application No. CN 201511006124.1, filed on Dec. 28, 2015. The disclosures of the aforementioned applications are hereby incorporated by reference in their entireties.

TECHNICAL FIELD

Embodiments of the invention relate to the field of communications technologies, and in particular, to a method for establishing a virtual access node in an optical access network and a device.

BACKGROUND

FIG. 1 is a schematic scenario diagram of an optical access network (OAN). The OAN includes: a customer premises network (CPN), an access network, and a service node function. The access network includes: an optical line termination (OLT), an optical distribution network (ODN), an optical network unit (ONU)/an optical network terminal (ONT), and an access function (AF). The AF mainly provides mutual conversion between an ONU/ONT interface and a user network interface (UNI). If the AF is built in the ONU, a reference point identified by (a) may be omitted in the access network in FIG. 1. If the AF is located between the OLT and a service node interface (SNI), the AF may be used for mutual conversion between an OLT interface and the SNI. "T" in FIG. 1 is a reference point of the UNI, and "V" is a reference point of the SNI. The OLT provides a network interface to the ODN.

As shown in FIG. 1, customer-premises equipment (CPE) is connected to the AF such as a digital subscriber line (DSL) by using the UNI interface. The AF converts a format of a received first packet, to obtain a second packet. The first packet is encapsulated in a UNI interface format, and the second packet is encapsulated in a format of an (a) interface by using which the CPE can communicate with the ONU. For example, the second packet is encapsulated to an Ethernet (ETH) link frame. The ONU converts the format of the second packet, to obtain a third packet. The third packet is encapsulated in a format in which the third packet can be transmitted on the ODN. For example, the third packet is encapsulated to an Ethernet passive optical network (EPON) frame or a common multiplexed frame of a passive optical integrated access standard Gigabit-Capable PON (GPON). The OLT converts the format of the third packet, to obtain a fourth packet. The fourth packet is encapsulated in an SNI interface format. For example, the fourth packet is encapsulated to an Ethernet link encapsulation. The OLT sends the fourth packet to an SNF.

Currently, if an infrastructure provider (InP) opens an access network of the InP, and wholesales the access network to a virtual network operator (VNO), a physical access node (AN) in the InP access network cannot satisfy a service requirement of user equipment in a VNO network.

SUMMARY

Embodiments of the invention provide a method for establishing a virtual access node in an optical access network and a device, so that an access node of an InP can be configured according to a service requirement, thereby improving configuration flexibility.

In at least one embodiment, a method for establishing a virtual access node in an optical access network includes:
obtaining, by an access device in a first network, an identifier of a virtual line corresponding to a physical line after receiving a first message from user equipment, where the physical line is a physical line between the user equipment and a physical access node AN in the first network, and the virtual line is a logical line between the user equipment and a virtual AN;
obtaining, by the access device, configuration information from a configuration server in a second network according to the identifier of the virtual line, where the configuration information is used to create the virtual AN; and
creating, by the access device, the virtual AN according to the configuration information.

In at least one embodiment, the obtaining, by an access device, an identifier of a virtual line corresponding to a physical line includes:
sending, by the access device, a second message to a first server in the first network, where the second message includes an identifier of the physical line; and
receiving, by the access device, the identifier of the virtual line that is sent by the first server.

In at least one embodiment, the obtaining, by an access device, an identifier of a virtual line corresponding to a physical line includes:
obtaining, by the access device, the identifier of the virtual line according to a correspondence and an identifier of the physical line, where the correspondence includes the identifier of the physical line and the identifier of the virtual line.

In at least one embodiment, the first message further includes an identifier of the second network, and the obtaining, by the access device, configuration information from a configuration server in a second network according to the identifier of the virtual line includes:
sending, by the access device, a third message to a second server in the second network according to the identifier of the second network in the first message, where the third message includes the identifier of the virtual line;
receiving, by the access device, an identifier of the configuration information and address information of the configuration server that are sent by the second server; and
obtaining, by the access device according to the identifier of the configuration information, the configuration information from the configuration server corresponding to the address information.

In at least one embodiment, after the obtaining, by an access device, an identifier of a virtual line corresponding to a physical line, the method further includes:
sending, by the access device, a second message to a DHCP server in the corresponding second network according to the identifier of the second network, where the second message includes the identifier of the virtual line;
receiving, by the access device, IP address information and the identifier of the virtual line that are returned by the DHCP server, and determining the identifier of the corresponding physical line according to the received identifier of the virtual line; and
binding, by the access device, the IP address information to the determined identifier of the physical line.

In at least one embodiment, the creating, by the access device, the virtual AN corresponding to the virtual line according to the configuration information further includes:

allocating, according to information used to indicate a network function corresponding to a service registered by the user equipment in the second network in the configuration information, the network function to the virtual AN corresponding to the virtual line.

In at least one embodiment, the creating, by the access device, the virtual AN corresponding to the virtual line according to the configuration information further includes:

allocating, according to information used to indicate a service function corresponding to the service registered by the user equipment in the second network in the configuration information, the service function to the virtual AN corresponding to the virtual line; and/or establishing, according to information used to indicate service functions corresponding to the service registered by the user equipment in the second network in the configuration information and an execution order of the service functions, a corresponding service function chain for the virtual AN corresponding to the virtual line.

In at least one embodiment, after the creating, by the access device, the virtual AN corresponding to the virtual line according to the configuration information, the method further includes:

establishing, by the access device, a channel that is between a physical AN and the virtual AN and that is for communication.

In at least one embodiment, a method for establishing a virtual access node in an optical access network includes:

obtaining, by a configuration server in a second network, configuration information according to an identifier of a virtual line, where the virtual line is a logical line between user equipment and a virtual access node AN, and the configuration information is used to create the virtual AN; and sending, by the configuration server, the configuration information to an access device in a first network.

In at least one embodiment, the obtaining, by a configuration server in a second network, configuration information according to an identifier of a virtual line includes:

receiving, by the configuration server, the identifier of the virtual line that is sent by the access device; and obtaining, by the configuration server, the configuration information according to a first correspondence and the identifier of the virtual line, where the first correspondence includes the configuration information and the identifier of the virtual line.

In at least one embodiment, the obtaining, by a configuration server in a second network, configuration information according to an identifier of a virtual line includes:

receiving, by the configuration server, an identifier of the configuration information that is sent by the access device, where the identifier of the configuration information is information obtained according to a second correspondence and the identifier of the virtual line, and the second correspondence includes the identifier of the virtual line and the identifier of the configuration information; and obtaining, by the configuration server, the configuration information according to a third correspondence and the identifier of the configuration information, where the third correspondence includes the configuration information and the identifier of the configuration information.

In at least one embodiment, an access device is applied to a first network and the access device includes:

a first obtaining module, configured to obtain an identifier of a virtual line corresponding to a physical line after receiving a first message from user equipment, where the physical line is a physical line between the user equipment and a physical access node AN in the first network, and the virtual line is a logical line between the user equipment and a virtual AN;

a second obtaining module, configured to obtain configuration information from a configuration server in a second network according to the identifier of the virtual line, where the configuration information is used to create the virtual AN; and a creation module, configured to create the virtual AN according to the configuration information.

In at least one embodiment, the first obtaining module is specifically configured to:

send a second message to a first server in the first network, where the second message includes an identifier of the physical line; and receive the identifier of the virtual line that is sent by the first server.

In at least one embodiment, the first obtaining module is specifically configured to:

obtain the identifier of the virtual line according to a correspondence and an identifier of the physical line, where the correspondence includes the identifier of the physical line and the identifier of the virtual line.

In at least one embodiment, the first message further includes an identifier of the second network, and the second obtaining module is specifically configured to:

send a third message to a second server in the second network according to the identifier of the second network in the first message, where the third message includes the identifier of the virtual line; receive an identifier of the configuration information and address information of the configuration server that are sent by the second server; and obtain, according to the identifier of the configuration information, the configuration information from the configuration server corresponding to the address information.

In at least one embodiment, a server is applied to a second network and the server includes:

an obtaining module, configured to obtain configuration information according to an identifier of a virtual line, where the virtual line is a logical line between user equipment and a virtual access node AN, and the configuration information is used to create the virtual AN; and a sending module, configured to send the configuration information to an access device in a first network.

In at least one embodiment, the obtaining module is specifically configured to:

receive the identifier of the virtual line that is sent by the access device; and obtain the configuration information according to a first correspondence and the identifier of the virtual line, where the first correspondence includes the configuration information and the identifier of the virtual line.

In at least one embodiment, the obtaining module is specifically configured to:

receive an identifier of the configuration information that is sent by the access device, where the identifier of the configuration information is information obtained according to a second correspondence and the identifier of the virtual line, and the second correspondence includes the identifier of the virtual line and the identifier of the configuration information; and obtain the configuration information according to a third correspondence and the identifier of the configuration information, where the third correspondence includes the configuration information and the identifier of the configuration information.

In at least one embodiment, an access device is applied to a first network and includes: a processor, an input interface, an output interface, a storage, and a system bus, where the processor is responsible for logical operations and processing; and when a server is running, the processor reads a program from the storage and performs operations in the embodiment described in the first aspect; and specifically:

after the input interface receives a first message from user equipment, the processor obtains an identifier of a virtual line corresponding to a physical line, where the physical line is a physical line between the user equipment and a physical access node AN in the first network, and the virtual line is a logical line between the user equipment and a virtual AN; obtains configuration information from a configuration server in a second network according to the identifier of the virtual line, where the configuration information is used to create the virtual AN; and creates the virtual AN according to the configuration information.

In at least one embodiment, the processor reads a program from the storage and specifically performs:

sending a second message to a first server in the first network, where the second message includes an identifier of the physical line; and receiving the identifier of the virtual line that is sent by the first server.

In at least one embodiment, the processor reads a program from the storage and specifically performs:

obtaining the identifier of the virtual line according to a correspondence and an identifier of the physical line, where the correspondence includes the identifier of the physical line and the identifier of the virtual line.

In at least one embodiment, the first message further includes an identifier of the second network, and the processor reads a program from the storage and specifically performs:

sending a third message to a second server in the second network according to the identifier of the second network in the first message, where the third message includes the identifier of the virtual line; receiving an identifier of the configuration information and address information of the configuration server that are sent by the second server; and obtaining, according to the identifier of the configuration information, the configuration information from the configuration server corresponding to the address information.

In at least one embodiment, a server is applied to a second network and includes:

a processor, an input interface, an output interface, a storage, and a system bus, where the processor is responsible for logical operations and processing; and when a server is running, the processor reads a program from the storage and performs operations in the embodiment described in the second aspect; and specifically:

the processor obtains configuration information according to an identifier of a virtual line, where the virtual line is a logical line between user equipment and a virtual access node AN, and the configuration information is used to create the virtual AN; and controls the output interface to send the configuration information to an access device in a first network.

In at least one embodiment, the processor reads a program from the storage and specifically performs:

receiving, by using the input interface, the identifier of the virtual line that is sent by the access device; and obtaining the configuration information according to a first correspondence and the identifier of the virtual line, where the first correspondence includes the configuration information and the identifier of the virtual line.

In at least one embodiment, the processor reads a program from the storage and specifically performs:

receiving, by using the input interface, an identifier of the configuration information that is sent by the access device, where the identifier of the configuration information is information obtained according to a second correspondence and the identifier of the virtual line, and the second correspondence includes the identifier of the virtual line and the identifier of the configuration information; and obtaining the configuration information according to a third correspondence and the identifier of the configuration information, where the third correspondence includes the configuration information and the identifier of the configuration information.

In the method and the device provided in the embodiments of the invention, after receiving the first message from the user equipment, the access device in the first network can automatically establish the virtual line corresponding to the physical line, and the virtual AN corresponding to the virtual line, so that communication between the user equipment and a virtual operator network can be implemented by using the virtual AN and the virtual line corresponding to the virtual AN. Because the virtual AN can support different protocols, and the virtual AN can be dynamically and flexibly configured according to a service requirement of the user equipment. When a service requested by the user equipment changes, only the virtual line and a network function of the virtual AN need to be updated or upgraded to satisfy the service requirement. In this way, an adjustment time is short and operation and maintenance costs are low.

BRIEF DESCRIPTION OF DRAWINGS

FIG. 3 is a schematic flowchart of a method according to an embodiment 2 of the invention;

FIG. 4 is a schematic diagram of a network architecture to which an embodiment 3 of the invention is applied;

DESCRIPTION OF EMBODIMENTS

Figure 1:
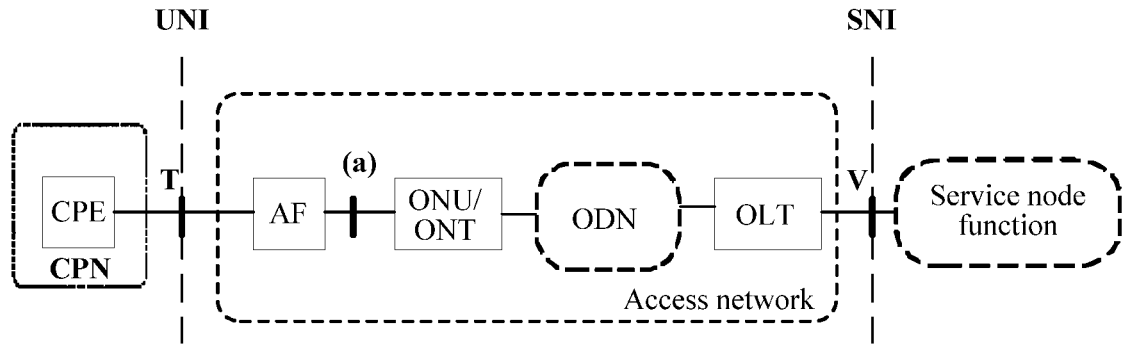
FIG. 1 is a schematic diagram of a reference network architecture of an optical access network.

In a method provided in an embodiment of the invention, after receiving a first message sent by user equipment, an access device in a first network determines an identifier of a virtual line according to a physical line used by the user equipment. The access device obtains, according to the identifier of the virtual line, configuration information for creating a virtual AN from a configuration server in a second network. The access device creates the virtual AN according to the configuration information. The first network is an access network in which an access node is deployed during network deployment, for example, an InP access network. The second network is a network in which an access node is not deployed during network deployment, for example, a VNO network. In at least some embodiments, the user equipment may communicate with a virtual operator network by using the virtual AN. Because the virtual AN can support different protocols, and the virtual AN can be flexibly configured according to a service requirement of the user equipment, so that an access node of an InP can be configured according to a service requirement, thereby improving configuration flexibility. When a service requested by the user equipment changes, the virtual line and a network function that correspond to the virtual AN may be updated or upgraded to satisfy the changed service requirement. In this way, an adjustment time is short and operation and maintenance costs are low.

The following describes network elements according to at least one embodiment of the invention.

In this embodiment of the invention, the user equipment accesses the first network by using a physical AN, and the physical AN in the first network may be virtualized to one or more virtual ANs. For example, each function of the physical AN is virtualized to one virtual AN. Alternatively, multiple physical ANs in the first network may be virtualized to one virtual AN. For example, same functions of the multiple physical ANs are virtualized to one virtual AN. A correspondence between the physical AN and the virtual AN is not limited in this embodiment of the invention. In this way, the user equipment may access one second network by using one or more virtual ANs, or may access multiple second networks by using multiple virtual ANs.

The physical AN in this embodiment of the invention may be a device such as a switch, a digital subscriber line access multiplexer (DSLAM), an ONU, an OLT, a cable media converter (CMC), a cable modem termination system (CMTS), or a converged cable access platform (CCAP). A specific implementation of the physical AN is not limited in this embodiment of the invention.

In this embodiment of the invention, a physical line of the physical AN is virtualized to a virtual line. The physical line may be identified by using a physical line identifier (ID). The physical line ID may also be referred to as an access loop ID or a circuit ID. The virtual line may be identified by using a virtual line ID. The virtual line ID may also be referred to as a virtual access loop ID or a virtual circuit ID.

In this embodiment of the invention, specific formats of an identifier of the physical line, that is, the physical line ID, and an identifier of the virtual line, that is, the virtual line ID are as follows:

1. When the first network is a DSL/the ETH, a format of the identifier of the physical line is specifically as follows:

if the physical line is a DSL line in an asynchronous transfer mode (ATM), the format of the identifier of the physical line is Access-Node-Identifier atm slot/port:vpi.vci; or if the physical line is a DSL/an ETH line of the ETH, the format of the identifier of the physical line is Access-Node-Identifier eth slot/port [:vlan-id].

Access-Node-Identifier is an identifier of a physical AN, such as a DSLAM. slot/port is at least one of a chassis number, a rack number, a frame number, a slot number, a sub-slot number, or a port number on the physical AN. vpi.vci is a virtual path identifier and a virtual channel identifier on the DSL line. vlan-id is a virtual local area network identifier, and vlan-id is optional.

2. When the second network is a DSL/the ETH, a format of the identifier of the virtual line is specifically as follows:

if the virtual line is a DSL line in an ATM, the format of the identifier of the virtual line is Access-Node-Identifier atm slot/port:vpi.vci; or if the virtual line is a DSL/an ETH line of the ETH, the format of the identifier of the virtual line is Access-Node-Identifier eth slot/port [:vlan-id].

Access-Node-Identifier is an identifier of a virtual AN, that is, a virtual AN ID. slot/port is at least one of a chassis number, a rack number, a frame number, a slot number, a sub-slot number, or a port number on the virtual AN. vpi.vci is a virtual path identifier and a virtual channel identifier on the DSL line. vlan-id is a virtual local area network identifier, and vlan-id is optional.

3. When the first network is a PON, the identifier of the physical line includes not only line ID information of an ONU portion, but also a line identifier of an OLT portion, and a specific format is as follows:

if the physical line is a DSL line in an ATM, the format of the identifier of the physical line is Access-Node-Identifier atm slot1/port1/ONUID/slot2/port2:vpi.vci; or if the physical line is a DSL/an ETH line of the ETH, the format of the identifier of the physical line is Access-Node-Identifier eth slot1/port1/ONUID/slot2/port2[:vlan-id].

Access-Node-Identifier is an identifier of an OLT. slot1/port1 is at least one of a chassis number, a rack number, a frame number, a slot number, a sub-slot number, or a port number on the OLT. slot2/port2 is at least one of a chassis number, a rack number, a frame number, a slot number, a sub-slot number, or a port number on the ONU. ONUID/slot2/port2:vpi.vci is the line ID information of the ONU portion. Access-Node-Identifier slot1/port1 is physical line ID information of the OLT portion.

4. When the second network is a PON, the identifier of the virtual line includes not only line ID information of an ONU portion, but also a line identifier of an OLT portion, and a specific format is as follows:

if the virtual line is a DSL line in an ATM, the format of the identifier of the virtual line is Access-Node-Identifier atm slot1/port1/ONUID/slot2/port2:vpi.vci; or if the virtual line is a DSL/an ETH line of the ETH, the format of the identifier of the virtual line is Access-Node-Identifier eth slot1/port1/ONUID/slot2/port2[:vlan-id].

Access-Node-Identifier is an identifier of an OLT. slot1/port1 is at least one of a chassis number, a rack number, a frame number, a slot number, a sub-slot number, or a port number on the OLT. slot2/port2 is at least one of a chassis number, a rack number, a frame number, a slot number, a sub-slot number, or a port number on the ONU. ONUID/slot2/port2:vpi.vci is the line ID information of the ONU portion. Access-Node-Identifier slot1/port1 is physical line ID information of the OLT portion.

In this embodiment of the invention, the first network and the second network may belong to a same operator. That is, this embodiment of the invention is applicable to a case in which a same operator supports both the physical AN and the virtual AN. For example, a same operator supports different services by using different virtual ANs, that is, a same physical network supports multiple services, thereby saving physical network establishment costs. Alternatively, the first network and the second network may belong to different operators.

Figure 2:
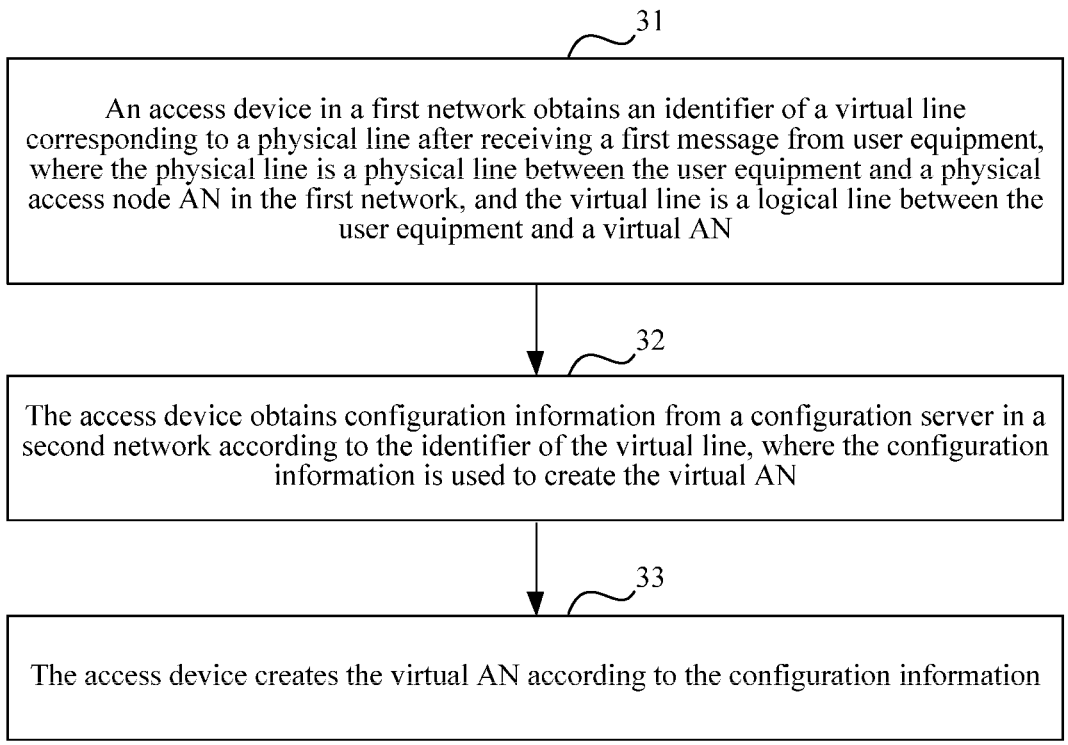
FIG. 2 is a schematic flowchart of a method according to an embodiment 1 of the invention.

In an embodiment 1 of the invention, a method for establishing a virtual access node in an optical access network is provided. As shown in FIG. 2, the method includes the following operations.

31. An access device in a first network obtains an identifier of a virtual line corresponding to a physical line after receiving a first message from user equipment, where the physical line is a physical line between the user equipment and a physical access node AN in the first network, and the virtual line is a logical line between the user equipment and a virtual AN.

32. The access device obtains configuration information from a configuration server in a second network according to the identifier of the virtual line, where the configuration information is used to create the virtual AN.

33. The access device creates the virtual AN according to the configuration information.

In this embodiment of the invention, after receiving the first message from the user equipment, the access device in the first network can automatically establish the virtual line corresponding to the physical line, and the virtual AN corresponding to the virtual line, so that communication between the user equipment and a virtual operator network can be implemented by using the virtual AN and the virtual line corresponding to the virtual AN. Because the virtual AN can support different protocols, and the virtual AN can be dynamically and flexibly configured according to a service requirement of the user equipment. When a service requested by the user equipment changes, only the virtual line and a network function of the virtual AN need to be updated or upgraded to satisfy the service requirement. In this way, an adjustment time is short and operation and maintenance costs are low.

In this embodiment of the invention, when the second network is started to be established, the virtual line and the network function (NF) of the virtual AN may not be deployed. The corresponding network function is deployed in real time only when a user is online and needs to access the second network by using the virtual line and the virtual AN, thereby effectively preventing a waste of network establishment investments of the second network. In this embodiment of the invention, the access device in the first network automatically establishes the virtual line and the virtual AN. The second network does not need to know establishment processes of the virtual line and the virtual AN but directly operates the virtual line and the virtual AN, so that operation and maintenance costs of the second network are reduced. In addition, because a virtual operator performs management and control on a virtual AN basis and does not directly perform management and maintenance on a physical AN, operation and maintenance costs are greatly reduced.

In this embodiment, a first access device may be a physical AN in the first network, or may be a first controller formed by separating from a control plane of the physical AN in the first network.

During implementation, the obtaining, by an access device in a first network, an identifier of a virtual line corresponding to a physical line in 31 includes the following two optional implementations:

Manner 1: The access device obtains the identifier of the virtual line from a first server of the first network. Specifically:

the access device sends a second message to the first server in the first network, where the second message includes an identifier of the physical line;

after receiving the second message sent by the access device, the first server allocates, according to the identifier of the physical line, the identifier of the virtual line corresponding to the physical line;

the first server sends the identifier of the virtual line to the access device; and the access device receives the identifier of the virtual line that is sent by the first server.

In this manner, the first server stores a correspondence between the identifier of the physical line and the identifier of the virtual line.

Manner 2: The access device locally obtains the identifier of the virtual line. Specifically, the access device obtains the identifier of the virtual line according to a first correspondence and the identifier of the physical line. The correspondence includes the identifier of the physical line and the identifier of the virtual line.

In this manner, the access device stores the correspondence between the identifier of the physical line and the identifier of the virtual line.

In an embodiment 2 of the invention, another method for establishing a virtual access node in an optical access network is provided. As shown in FIG. 3, the method includes the following operations.

41. A configuration server in a second network obtains configuration information according to an identifier of a virtual line, where the virtual line is a logical line between user equipment and a virtual access node AN, and the configuration information is used to create the virtual AN.

42. The configuration server sends the configuration information to an access device in a first network.

In this embodiment of the invention, the configuration server in the second network obtains the configuration information according to the identifier of the virtual line, and sends the configuration information to the access device in the first network, so that the access device can create the virtual AN according to the configuration information, thereby automatically establishing the virtual AN.

During implementation, the obtaining, by a configuration server, configuration information according to an identifier of a virtual line in 41 includes the following two optional implementations:

Manner 1: The identifier of the virtual line is received by the configuration server. A specific implementation is as follows:

the configuration server receives the identifier of the virtual line that is sent by the access device; and the configuration server obtains the configuration information according to a first correspondence and the identifier of the virtual line, where the first correspondence includes the configuration information and the identifier of the virtual line.

In this manner, the access device may directly send the identifier of the virtual line to the configuration server, or may send the identifier of the virtual line to the configuration server by using an IP edge node in the second network, or may send the identifier of the virtual line to the configuration server by using a second controller formed by separating from a control plane of an IP edge node in the second network. The second controller is configured to control the virtual AN.

Manner 2: An identifier of the configuration information is received by the configuration server. A specific implementation is as follows:

the configuration server receives the identifier of the configuration information that is sent by the access device, where the identifier of the configuration information is information obtained according to a second correspondence and the identifier of the virtual line, and the second correspondence includes the identifier of the virtual line and the identifier of the configuration information; and the configuration server obtains the configuration information according to a third correspondence and the identifier of the configuration information, where the third correspondence includes the configuration information and the identifier of the configuration information.

In this manner, the access device may directly send the identifier of the configuration information to the configuration server, or may send the identifier of the configuration information to the configuration server by using an IP edge node in the second network, or may send the identifier of the configuration information to the configuration server by using a second controller formed by separating from a control plane of the IP edge node in the second network. The second controller is configured to control the virtual AN.

The following describes, in detail from the perspective of an interaction process of network elements by using the following specific embodiments, the method for establishing a virtual access node in an optical access network provided in this embodiment of the invention. In the embodiments, the first network is an InP access network, and the second network is a VNO network.

A network architecture to which an embodiment 3 according to embodiments of the invention is applied is shown in FIG. 4, a physical AN is virtualized to two virtual ANs, that is, a virtual AN 1 and a virtual AN 2. The virtual AN 1 accesses a VNO1 network by using an IP edge node 1, and the virtual AN 2 accesses a VNO2 network by using an IP edge node 2. In this embodiment, the physical AN establishes the virtual AN, that is, the virtual AN 1 and the virtual AN 2.

A process of establishing a virtual access node in an optical access network in this embodiment is described, by using an example in which the virtual AN 1 is established, from the perspective that network elements interact with each other by using different protocols. A process of establishing the virtual AN 2 is similar to the process of establishing the virtual AN 1, and in this embodiment, the process of establishing the virtual AN 2 is not described again by using examples one by one.

Figure 5A:
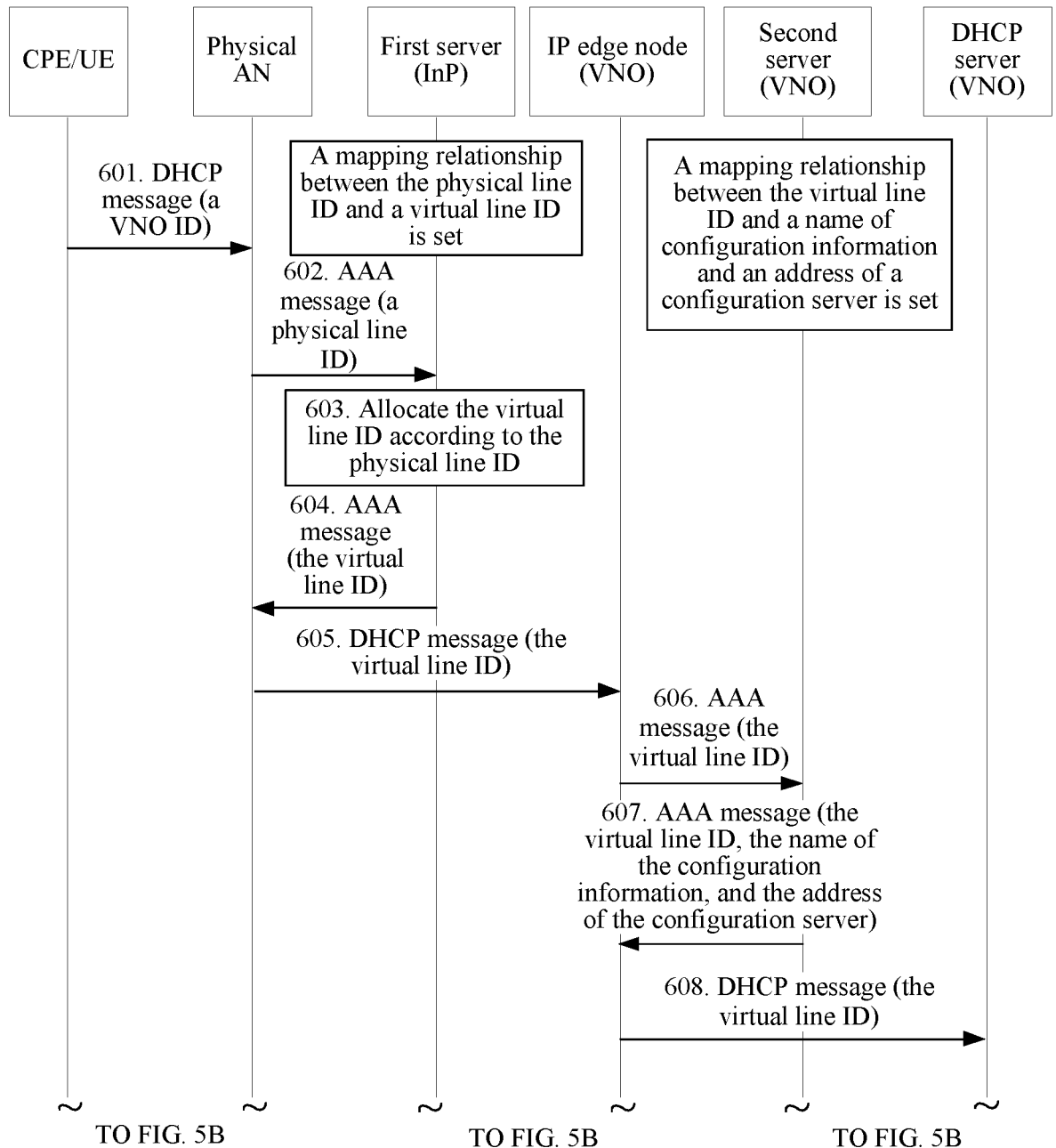
FIG. 5A and FIG. 5B show a schematic flowchart of a method according to an embodiment 3 of the invention.
Figure 5B:
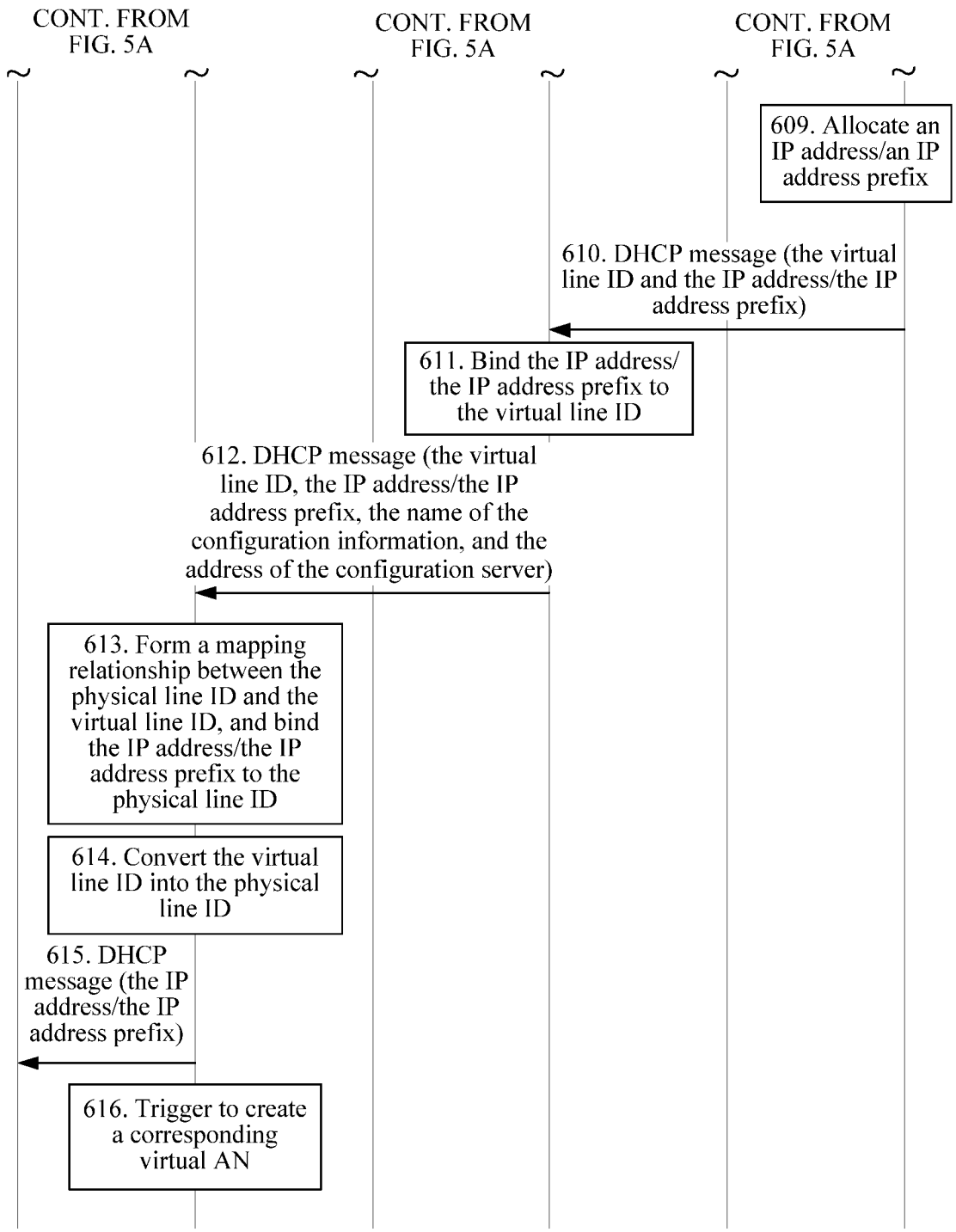

1. The Dynamic Host Configuration Protocol (DHCP) is used between the network elements. A specific process is as follows, as shown in FIG. 5A and FIG. 5B:

601. User equipment such as CPE/UE sends a DHCP message to a physical AN, where the DHCP message includes an identifier of a VNO selected by the CPE/the UE, that is a VNO ID. In this embodiment, the DHCP message may be a first message.

602. The physical AN sends an AAA message to a first server in a first network, where the AAA message includes a physical line ID.

Specifically, after receiving the DHCP message sent by the CPE/the UE, the physical AN obtains the physical line ID. The physical AN sends the AAA message to the first server. In this embodiment, the AAA message sent by the physical AN to the first server may be a second message.

In this embodiment, the first server may be an AAA server, and a type of the first server is not limited in this embodiment.

603. The first server allocates a virtual line ID to the physical line ID according to the physical line ID.

Specifically, after receiving the AAA message sent by the physical AN, the first server obtains the physical line ID, and the first server allocates the virtual line ID to the physical line ID according to the obtained physical line ID.

In an optional implementation, a correspondence between the physical line ID and the virtual line ID is preconfigured in the first server. The first server determines, according to the obtained physical line ID and the correspondence, the virtual line ID corresponding to the physical line ID.

In another optional implementation, a correspondence between the physical line ID and a virtual line ID pool corresponding to the physical line ID is set in the first server. The first server selects the corresponding virtual line ID pool according to the obtained physical line ID and the correspondence, and selects a virtual line ID from the virtual line ID pool to allocate to the physical line ID. A specific selection policy is not limited in this embodiment of the invention. The virtual line ID may be randomly selected, or may be selected according to a number sequence of virtual line IDs in the virtual line ID pool, or the like.

604. The first server sends an AAA message to the physical AN, where the sent AAA message includes the virtual line ID.

605. The physical AN sends a DHCP message, that is, a third message, to an IP edge node 1 in a VNO network, where the sent DHCP message includes the virtual line ID.

Specifically, after receiving the AAA message sent by the first server, the physical AN obtains the virtual line ID. The physical AN sends, according to the VNO ID included in the DHCP message sent by the CPE/the UE, the DHCP message to the IP edge node 1 in the VNO network corresponding to the VNO ID.

606: The IP edge node 1 sends an AAA message to a second server in the VNO network, where the sent AAA message includes the virtual line ID.

Specifically, after receiving the DHCP message sent by the physical AN, the IP edge node 1 obtains the virtual line ID. The IP edge node 1 sends the AAA message to the second server.

The second server may be an AAA server, and a type of the second server is not limited in this embodiment.

607. The second server sends an AAA message to the IP edge node 1, where the sent AAA message includes a name of configuration information and an address of a configuration server that correspond to the virtual line ID.

Specifically, after receiving the AAA message sent by the IP edge node 1, the second server obtains the virtual line ID. According to a preset mapping relationship between the virtual line ID and the name of the configuration information and the address of the configuration server, the second server determines the name of the configuration information and the address of the configuration server that correspond to the virtual line ID, and sends the AAA message to the IP edge node 1.

The second server may be an AAA server, and a type of the second server is not limited in this embodiment. The mapping relationship between the virtual line ID and the name of the configuration information and the address of the configuration server is preset in the second server.

It should be noted that the name of the configuration information, that is, an identifier of the configuration information, is used to identify configuration information needed for creating a virtual AN. The address of the configuration server, that is, address information of the configuration server, is used to store the configuration information. Configuration information corresponding to all virtual ANs may be stored in one configuration server, or configuration information corresponding to all virtual ANs may be divided into multiple sets, and the sets are stored in different configuration servers. For example, configuration information corresponding to virtual ANs connected to a same VNO network are divided into one set, and are stored in a same configuration server.

The configuration information includes, but is not limited to, at least one of the following information: a network function supported by the virtual AN, a service function supported by the virtual AN, or a port of the virtual AN. The port of the virtual AN may be a port for communication between the virtual AN and a user side, or a port for communication between the virtual AN and a network side.

608. The IP edge node 1 sends a DHCP message to a DHCP server in the VNO network, where the sent DHCP message includes the virtual line ID.

Specifically, after receiving the AAA message sent by the second server, the IP edge node 1 obtains the virtual line ID. The IP edge node 1 sends the DHCP message to the DHCP server.

609. The DHCP server allocates IP address information to the CPE/the UE according to the virtual line ID, where an IP address is an IP address or an IP address prefix, and is marked as an IP address/an IP address prefix.

Specifically, after receiving the DHCP message sent by the IP edge node 1, the DHCP server obtains the virtual line ID. The DHCP server allocates the IP address information to the CPE/the UE according to the virtual line ID.

610. The DHCP server sends a DHCP message to the IP edge node 1, where the sent DHCP message includes the allocated IP address information and the virtual line ID.

611. The IP edge node 1 binds the allocated IP address information to the virtual line ID.

Specifically, after receiving the DHCP message sent by the DHCP server, the IP edge node 1 obtains the allocated IP address information and the virtual line ID. The IP edge node 1 binds the allocated IP address information to the virtual line ID.

612. The IP edge node 1 sends a DHCP message to the physical AN, where the sent DHCP message includes the allocated IP address information, the virtual line ID, the name of the configuration information, and the address of the configuration server.

613. The physical AN forms a mapping relationship between the physical line ID and the virtual line ID.

Specifically, after receiving the DHCP message sent by the IP edge node 1, the physical AN obtains the allocated IP address information, the virtual line ID, the name of the configuration information, and the address of the configuration server. The physical AN forms the mapping relationship between the physical line ID and the virtual line ID.

Optionally, the physical AN binds the allocated IP address/IP address prefix to the physical line ID.

614. The physical AN converts the virtual line ID into the physical line ID.

Specifically, the physical AN determines, according to the virtual line ID included in the received DHCP message, the physical line ID corresponding to the virtual line ID.

615. The physical AN sends a DHCP message to the CPE/the UE, where the sent DHCP message includes the IP address information.

Specifically, the physical AN deletes the virtual line ID from the received DHCP message, and sends the DHCP message to the CPE/the UE by using the physical line corresponding to the physical line ID.

Optionally, the sent DHCP message includes the VNO ID, so that the CPE/the UE selects, according to the VNO ID included in the received DHCP message, an operator corresponding to the VNO ID to perform subsequent operations and processing, for example, an Internet access operation/a voice call.

616. The physical AN triggers to create a corresponding virtual AN.

Figure 6:
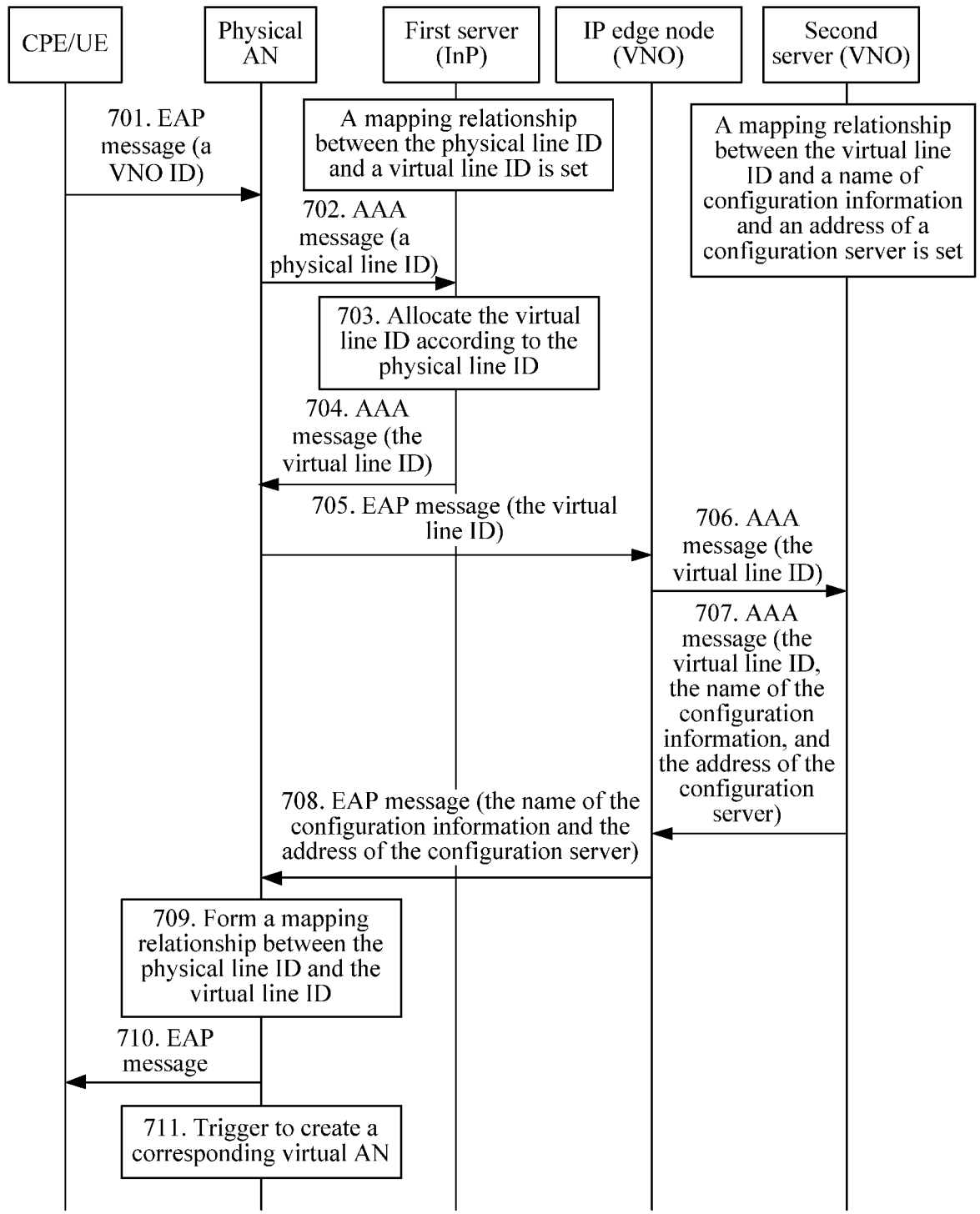
FIG. 6 is another schematic flowchart of the method according to an embodiment 3 of the invention.

2. The Extensible Authentication Protocol (EAP) is used between the network elements. A specific process is as follows, as shown in FIG. 6:

701. CPE/UE sends an EAP message, that is, a first message, to a physical AN, where the sent EAP message includes a VNO ID selected by the CPE/the UE.

702. The physical AN sends an AAA message, that is, a second message, to a first server in a first network, where the AAA message includes an identifier of a physical line.

Specifically, after receiving the EAP message sent by the CPE/the UE, the physical AN obtains the identifier of the physical line. The physical AN sends the AAA message to the first server, so that the first server allocates an identifier of a virtual line to the physical line ID.

For 703 and 704, respectively refer to related descriptions of 603 and 604 in the embodiment shown in FIG. 5A and FIG. 5B.

705. The physical AN sends an EAP message, that is, a third message, to an IP edge node 1 in a VNO network, where the sent EAP message includes the virtual line ID.

Specifically, after receiving the AAA message sent by the first server, the physical AN obtains the virtual line ID. The physical AN sends, according to the VNO ID included in the EAP message sent by the CPE/the UE, the EAP message to the IP edge node 1 in the VNO network corresponding to the VNO ID.

706. The IP edge node 1 sends an AAA message to a second server in the VNO network, where the sent AAA message includes the virtual line ID.

Specifically, after receiving the EAP message sent by the physical AN, the IP edge node 1 obtains the virtual line ID. The IP edge node 1 sends the AAA message to the second server.

For a description of the second server, refer to a related description in the embodiment shown in FIG. 5A and FIG. 5B.

For 707, refer to a related description of 607 in the embodiment shown in FIG. 5A and FIG. 5B.

708. The IP edge node 1 sends an EAP message to the physical AN, where the sent EAP message includes a name of configuration information and an address of a configuration server.

Optionally, the sent EAP message further includes the virtual line ID.

If the sent EAP message does not include the virtual line ID, the IP edge node 1 carries the virtual line ID by using a channel ID of a channel between the IP edge node 1 and the physical AN, so that the IP edge node 1 needs to determine the corresponding virtual line ID according to the channel ID. For example, the IP edge node 1 may maintain a mapping relationship between the channel ID and the corresponding virtual line ID.

709. The physical AN forms a mapping relationship between the physical line ID and the virtual line ID.

Specifically, after receiving the EAP message sent by the IP edge node 1, the physical AN obtains the virtual line ID. The physical AN forms the mapping relationship between the physical line ID and the virtual line ID.

710. The physical AN sends an EAP message to the CPE/the UE.

Specifically, the physical AN determines, according to the virtual line ID included in the received EAP message, the physical line ID corresponding to the virtual line ID, and sends the EAP message to the CPE/the UE by using the physical line corresponding to the physical line ID, so that the CPE/the UE makes an authentication response according to the EAP message.

Optionally, the sent EAP message includes the VNO ID, so that the CPE/the UE selects, according to the VNO ID included in the received EAP message, an operator corresponding to the VNO ID to perform subsequent operations and processing, for example, an Internet access operation/a voice call.

711. The physical AN triggers to create a corresponding virtual AN.

Figure 7:
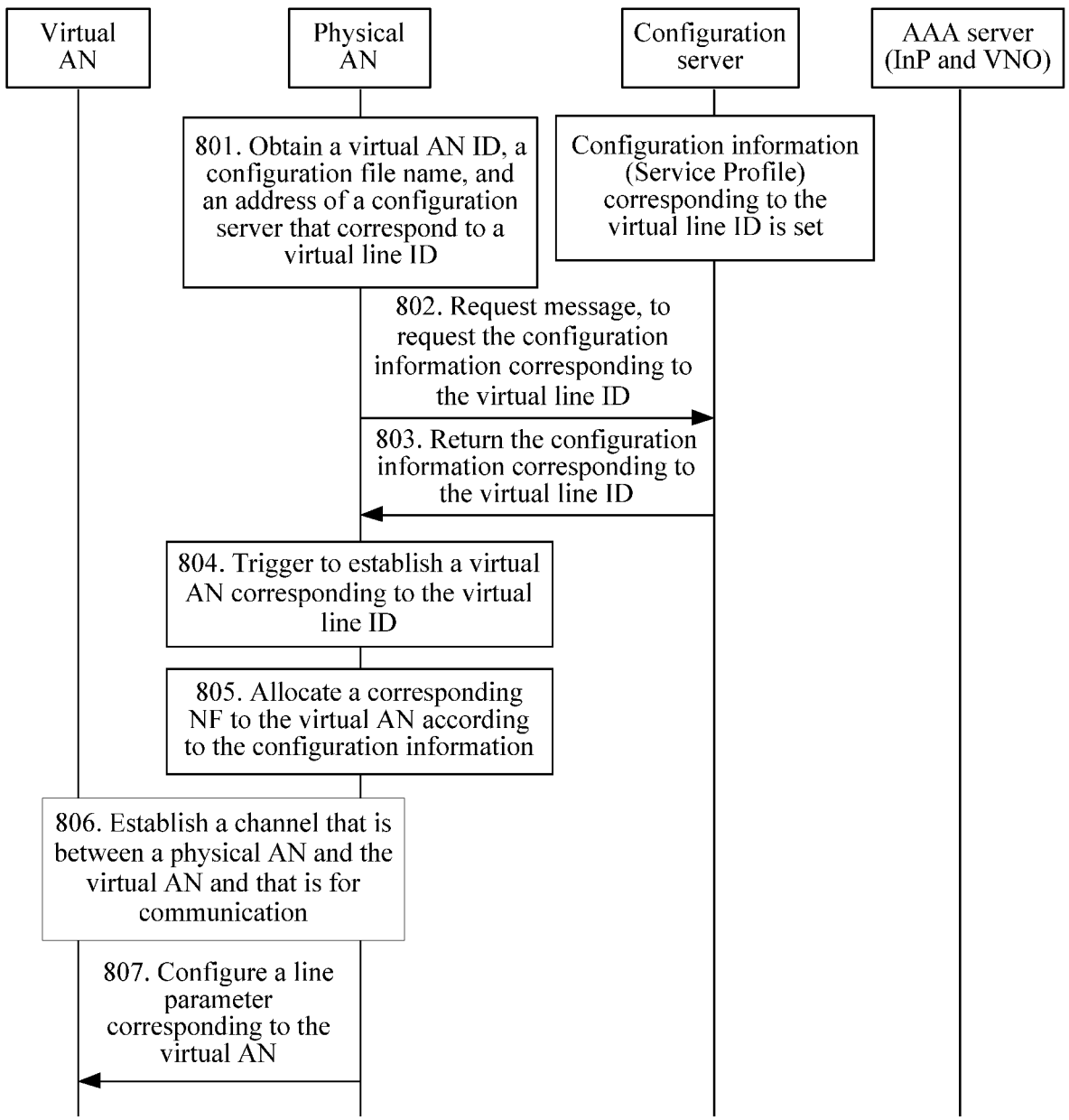
FIG. 7 is still another schematic flowchart of the method according to an embodiment 3 of the invention.

In the embodiments shown in FIG. 5A and FIG. 5B and FIG. 6, a process in which the physical AN triggers to create the corresponding virtual AN on a network device, such as a physical AN or a server of a data center, is shown in FIG. 7 and includes the following operations.

801. The physical AN obtains an identifier of the virtual AN, that is, a virtual AN ID, the name of the configuration information, and the address of the configuration server that correspond to the virtual line ID allocated by the first server in the first network.

Because the virtual line ID includes an Access-Node-Identifier field, and a field value of the Access-Node-Identifier field in the virtual line ID is the virtual AN ID, the virtual AN ID may be obtained from the virtual line ID.

802. The physical AN sends a request message to the configuration server, to request to obtain the configuration information corresponding to the virtual line ID.

Specifically, the physical AN sends the request message to the configuration server according to the address of the configuration server, to request to obtain the configuration information corresponding to the virtual line ID. The request message includes the name of the configuration information or the virtual line ID.

803. The configuration server returns the configuration information of the virtual AN corresponding to the virtual line ID to the physical AN.

Specifically, after receiving the request message sent by the physical AN, the configuration server obtains the corresponding configuration information by using the foregoing manner 1 or manner 2.

Configuration information of virtual ANs corresponding to virtual line IDs is set in the configuration server, and the configuration information is stored by using names of the configuration information as entries.

804. The physical AN triggers to establish the virtual AN corresponding to the virtual line.

Specifically, the physical AN receives the configuration information returned by the configuration server, and triggers, according to the configuration information, to establish the virtual AN corresponding to the virtual line.

Optionally, the process further includes the following content:

805. The physical AN allocates, according to the configuration information, a network function to the virtual AN corresponding to the virtual line.

Specifically, the physical AN allocates, according to information used to indicate a network function corresponding to a service registered by the user equipment in the second network in the configuration information, the network function to the virtual AN corresponding to the virtual line.

For example, assuming that the user equipment subscribes to a home service in the second network, a network function corresponding to the home service is a network function that the virtual AN needs to have to implement the home service. The corresponding network function is allocated to the virtual AN according to information about the network function corresponding to the home service, so that the virtual AN can implement the home service that the user equipment subscribes to.

Optionally, in this embodiment, 805 further includes:

allocating, by the physical AN according to information used to indicate a service function corresponding to the service registered by the user equipment in the second network in the configuration information, the service function (SF) to the virtual AN; and/or establishing, by the physical AN, a corresponding service function chain (SFC) for the virtual AN according to information used to indicate service functions corresponding to the service registered by the user equipment in the second network in the configuration information and an execution order of the service functions.

For example, an example in which the user equipment in the second network subscribes to the home service is still used, service functions allocated to the virtual AN includes a firewall, parent control, deep packet inspection, and the like, and a corresponding service function chain established for the virtual AN is an execution order of the foregoing service functions.

In this embodiment, the virtual AN may run on the physical AN, or may run on a controller, or may run on a server. Optionally, if the virtual AN runs on the server, the process further includes the following operations.

806. The physical AN establishes a channel that is between the physical AN and the virtual AN and that is for communication.

Specifically, the physical AN configures a channel endpoint, such as a virtual tunnel endpoint (VTEP), on the physical AN, and configures a channel endpoint, such as a VTEP, of the virtual AN or a gateway in which the virtual AN is located, so as to establish the channel between the physical AN and the virtual AN.

807. The physical AN configures a line parameter corresponding to the virtual AN, where the line parameter includes, but is not limited to, at least one of the following parameters: a bandwidth parameter, a QoS parameter, or a line type.

The virtual AN may be automatically established by means of the foregoing process, and then the physical AN may notify servers in an InP access network and the VNO network, that is, the first server and the second server, to charge the virtual line and the corresponding NF/SF.

Figure 8:
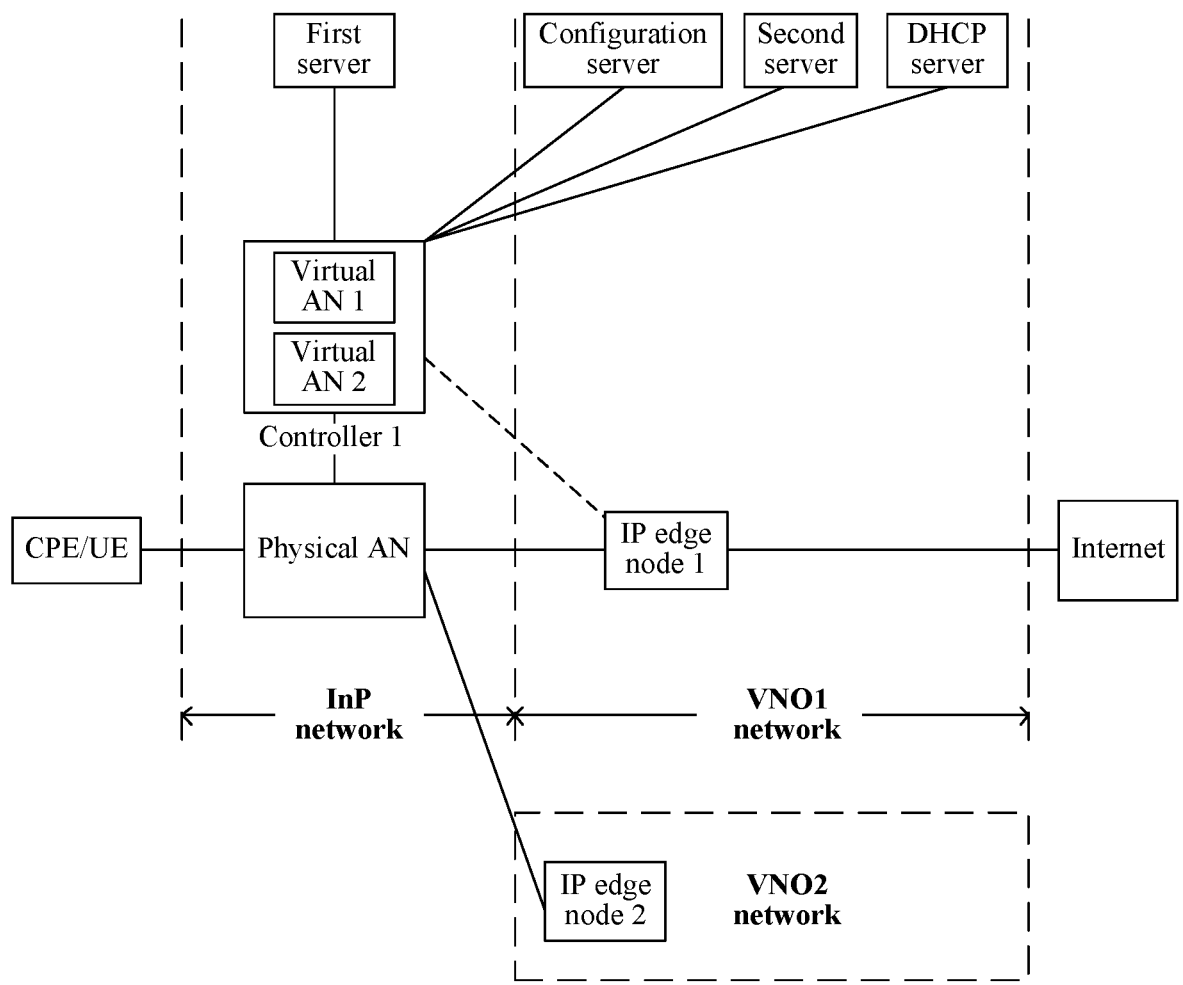
FIG. 8 is a schematic diagram of a network architecture to which an embodiment 4 of the invention is applied.

A network architecture to which an embodiment 4 according to embodiments of the invention is applied is shown in FIG. 8. A control plane and a forwarding plane of a physical AN are separated, a function of the control plane of the physical AN is integrated into a controller 1, and the physical AN is virtualized on the controller 1. The controller 1 supports presentation of different virtual ANs and virtual lines to different VNOs, and the different virtual ANs and virtual lines may be controlled by the different VNOs. The physical AN is virtualized to two virtual ANs, that is, a virtual AN 1 and a virtual AN 2, on the controller 1. CPE/UE accesses a VNO1 network by using the virtual AN 1, and the CPE/the UE accesses a VNO2 network by using the virtual AN 2. In the network architecture shown in FIG. 8, the controller is separately connected to a configuration server, a second server, and a DHCP server in the VNO network. In this embodiment, the controller 1 establishes the virtual AN, that is, the virtual AN 1 and the virtual AN 2, corresponding to a virtual line.

A process of establishing a virtual access node in an optical access network in this embodiment is described, by using an example in which the virtual AN 1 is established, from the perspective that network elements interact with each other by using different protocols. A process of establishing the virtual AN 2 is similar to the process of establishing the virtual AN 1, and in this embodiment, the process of establishing the virtual AN 2 is not described again by using examples one by one.

Figure 9:
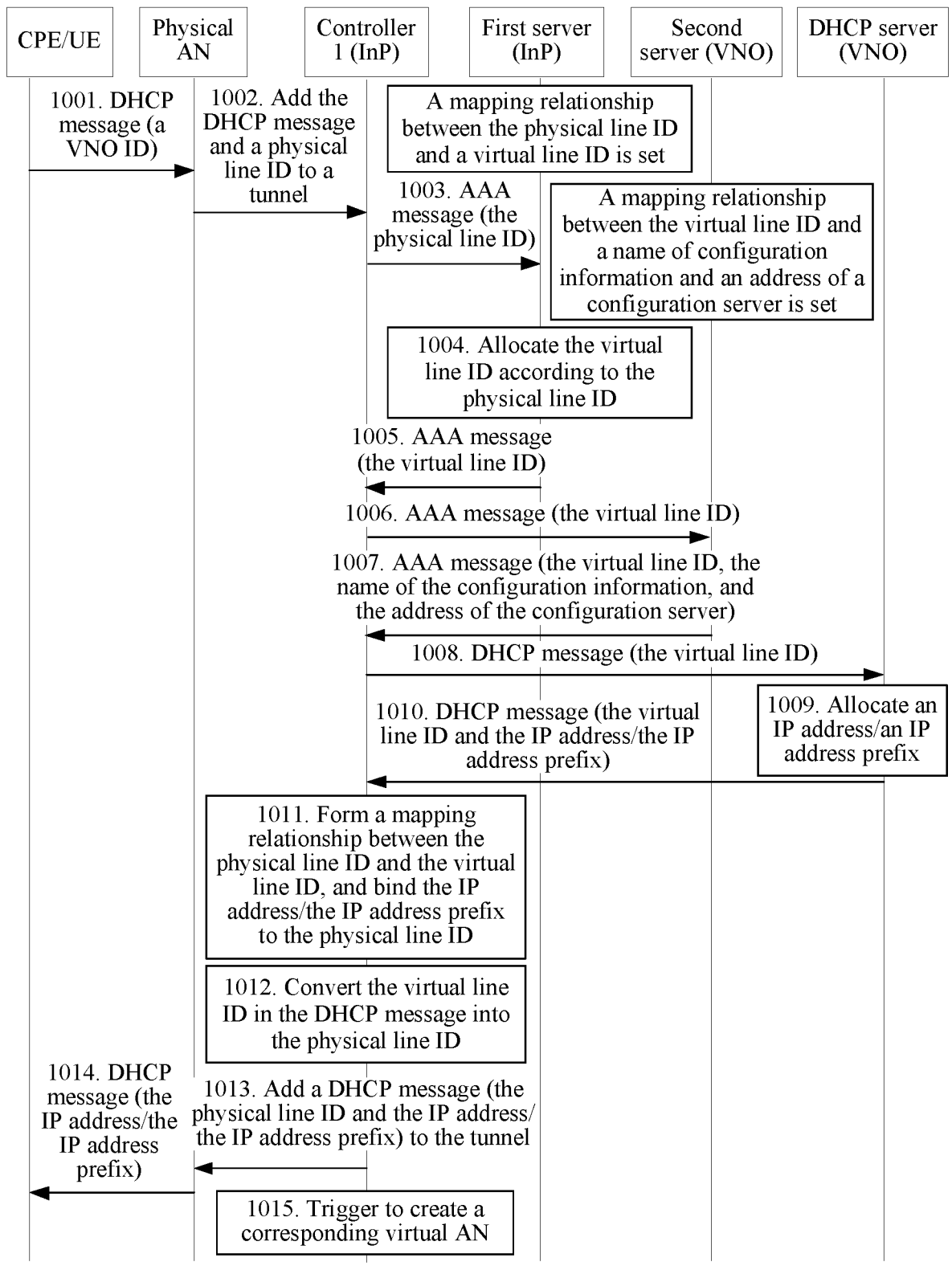
FIG. 9 is a schematic flowchart of a method according to an embodiment 4 of the invention.

1. The DHCP is used between the network elements. A specific process is as follows, as shown in FIG. 9:

For 1001, refer to a related description of 601 in the embodiment shown in FIG. 5A and FIG. 5B.

1002. The physical AN sends a DHCP message and a physical line ID to a controller 1 by adding the DHCP message and the physical line ID to a tunnel.

Specifically, after receiving the DHCP message sent by the CPE/the UE, the physical AN sends the DHCP message and the physical line ID to the controller 1 by adding the DHCP message and the physical line ID to the tunnel that is between the physical AN and the controller 1 and that is for communication.

1003. The controller 1 sends an AAA message, that is, a second message, to a first server in a first network, where the sent AAA message includes the physical line ID.

Specifically, the controller 1 receives, by using the tunnel, the DHCP message and the physical line ID that are sent by the physical AN. The controller 1 sends the AAA message to the first server, so that the first server allocates a virtual line ID to the physical line ID.

In this embodiment, after receiving the VNO ID sent by the physical AN, the controller 1 further determines a VNO corresponding to the VNO ID.

For details of 1004, refer to a related description of 603 in the embodiment shown in FIG. 5A and FIG. 5B.

Specifically, after receiving the AAA message sent by the controller 1, the first server obtains the physical line ID.

1005. The first server sends an AAA message, that is, a third message, to the controller 1, where the sent AAA message includes the allocated virtual line ID.

1006. The controller 1 sends an AAA message to a second server in a VNO network, where the sent AAA message includes the virtual line ID.

Specifically, after receiving the AAA message sent by the first server, the controller 1 obtains the virtual line ID. The controller 1 sends, according to the VNO ID included in the DHCP message sent by the CPE/the UE, the AAA message to the second server in the VNO network corresponding to the VNO ID.

1007. The second server sends an AAA message to the controller 1, where the sent AAA message includes a name of configuration information and an address of a configuration server that correspond to the virtual line ID.

Specifically, after receiving the AAA message sent by the controller 1, the second server obtains the virtual line ID. According to a preset mapping relationship between the virtual line ID and the name of the configuration information and the address of the configuration server, the second server determines the name of the configuration information and the address of the configuration server that correspond to the virtual line ID, and sends the AAA message to the controller 1.

For details of the second server, the name of the configuration information, the address of the configuration server, and the configuration information, refer to related descriptions in the embodiment shown in FIG. 5A and FIG. 5B.

1008. The controller 1 sends a DHCP message to a DHCP server in the VNO network, where the sent DHCP message includes the virtual line ID.

Specifically, after receiving the AAA message sent by the second server, the controller 1 obtains the virtual line ID. The controller 1 sends the DHCP message to the DHCP server.

For 1009, refer to a related description of 609 in the embodiment shown in FIG. 5A and FIG. 5B.

1010. The DHCP server sends a DHCP message to the controller 1, where the sent DHCP message includes the allocated IP address information and the virtual line ID.

1011. The controller 1 forms a mapping relationship between the physical line ID and the virtual line ID, and binds the allocated IP address information to the physical line ID.

Specifically, after receiving the DHCP message sent by the DHCP server, the controller 1 obtains the allocated IP address information and the virtual line ID. The controller 1 forms the mapping relationship between the physical line ID and the virtual line ID, and binds the allocated IP address information to the physical line ID.

1012. The controller 1 converts the virtual line ID in the received DHCP message into the physical line ID.

1013. The controller 1 sends a DHCP message to the physical AN by using the tunnel, where the DHCP message includes the physical line ID and the IP address information.

1014. The physical AN sends a DHCP message to the CPE/the UE.

Specifically, after receiving the DHCP message sent by the controller 1, the physical AN determines the physical line corresponding to the physical line ID, and sends the DHCP message to the CPE/the UE by using the physical line.

Optionally, the sent DHCP message includes the VNO ID, so that the CPE/the UE selects, according to the VNO ID included in the received DHCP message, an operator corresponding to the VNO ID to perform subsequent operations and processing, for example, an Internet access operation/a voice call.

1015. The controller 1 triggers to create a corresponding virtual AN.

Figure 10:
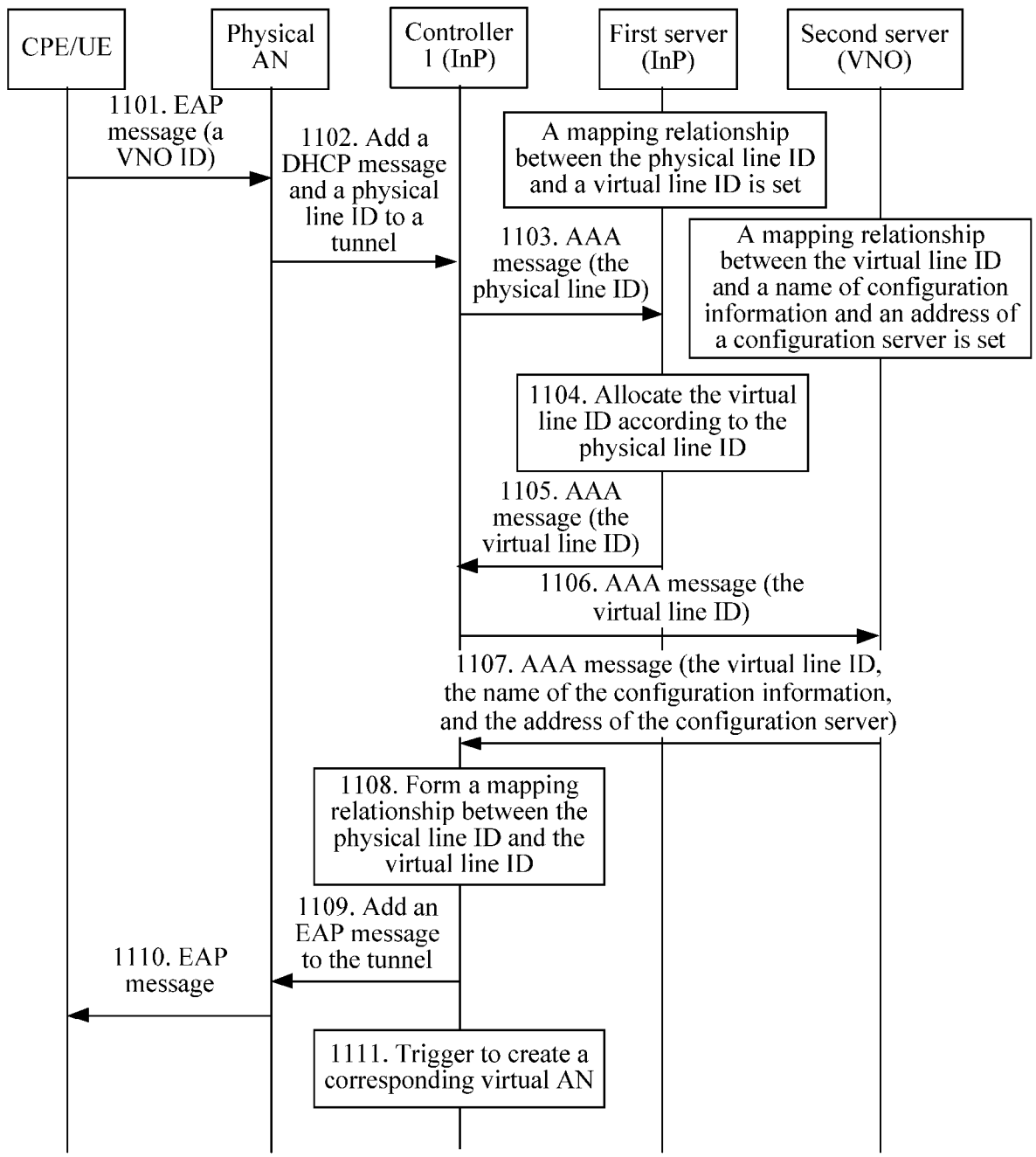
FIG. 10 is another schematic flowchart of the method according to an embodiment 4 of the invention.

2. The EAP is used between network elements. A specific process is as follows, as shown in FIG. 10:

For 1101, refer to a related description of 701 in the embodiment shown in FIG. 6.

1102. The physical AN sends the EAP message and a physical line ID to a controller 1 by adding the EAP message and the physical line ID to a tunnel. A specific process is similar to 1002 in the embodiment shown in FIG. 9.

For 1103 to 1107, respectively refer to 1003 to 1007 in the embodiment shown in FIG. 9.

1108. The controller 1 forms a mapping relationship between the physical line ID and the virtual line ID.

Specifically, after receiving the AAA message sent by the second server, the controller 1 forms the mapping relationship between the physical line ID and the virtual line ID.

1109. The controller 1 sends an EAP message to the physical AN by using the tunnel.

1110. The physical AN sends an EAP message to the CPE/the UE.

Specifically, after receiving the EAP message sent by the controller 1, the physical AN determines the physical line corresponding to the physical line ID, and sends the EAP message to the CPE/the UE by using the physical line, so that the CPE/the UE performs authentication in an AAA server in a virtual operator network according to the EAP message.

Optionally, the sent EAP message includes the VNO ID, so that the CPE/the UE selects, according to the VNO ID included in the received EAP message, an operator corresponding to the VNO ID to perform subsequent operations and processing, for example, an Internet access operation/a voice call.

1111. The controller 1 triggers to create a corresponding virtual AN.

Figure 11:
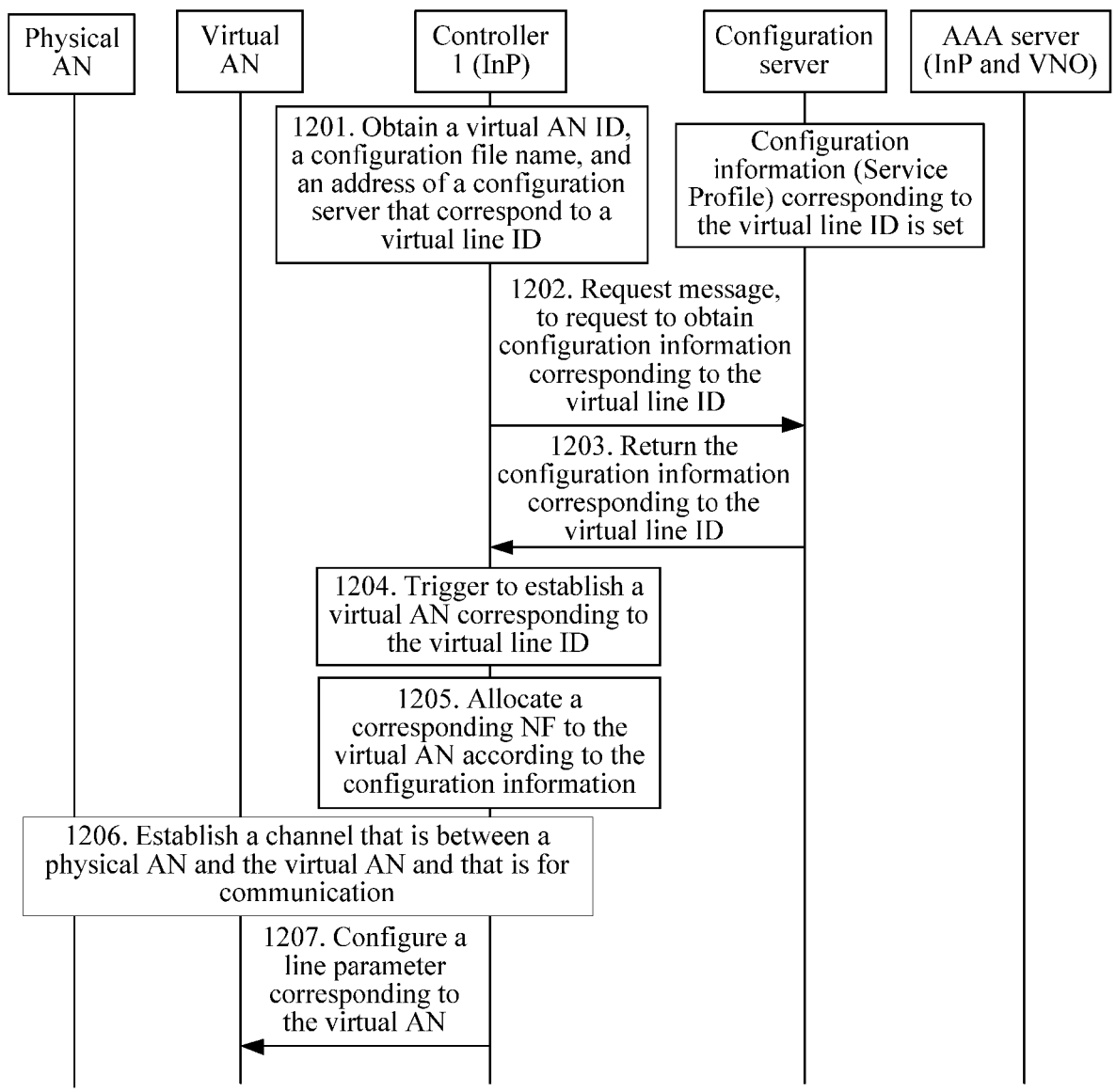
FIG. 11 is still another schematic flowchart of the method according to an embodiment 4 of the invention.

In the embodiments shown in FIG. 9 and FIG. 10, a process in which the controller 1 triggers to create the corresponding virtual AN is shown in FIG. 11 and includes the following operations.

For 1201 to 1205, refer to related descriptions of 801 to 805 in the embodiment shown in FIG. 7, and a difference between this embodiment and the embodiment shown in FIG. 7 is that this embodiment is performed by the controller 1, but the embodiment shown in FIG. 7 is performed by the physical AN.

In this embodiment, the virtual AN may run on the physical AN, or may run on a controller, or may run on a server. Optionally, if the virtual AN runs on the server, the process further includes the following operations.

1206. The controller 1 further establishes a channel that is between the physical AN and the virtual AN or a gateway in which the virtual AN is located and that is for communication.

Specifically, the controller 1 configures a channel endpoint, such as a VTEP, on the physical AN, and the controller 1 configures a channel endpoint, such as a VTEP, of the virtual AN or the gateway in which the virtual AN is located, so as to establish the channel between the physical AN and the virtual AN.

For 1207, refer to a related description of 807 in the embodiment shown in FIG. 7, and a difference between this embodiment and the embodiment shown in FIG. 7 is that this embodiment is performed by the controller 1, but the embodiment shown in FIG. 7 is performed by the physical AN.

Figure 12:
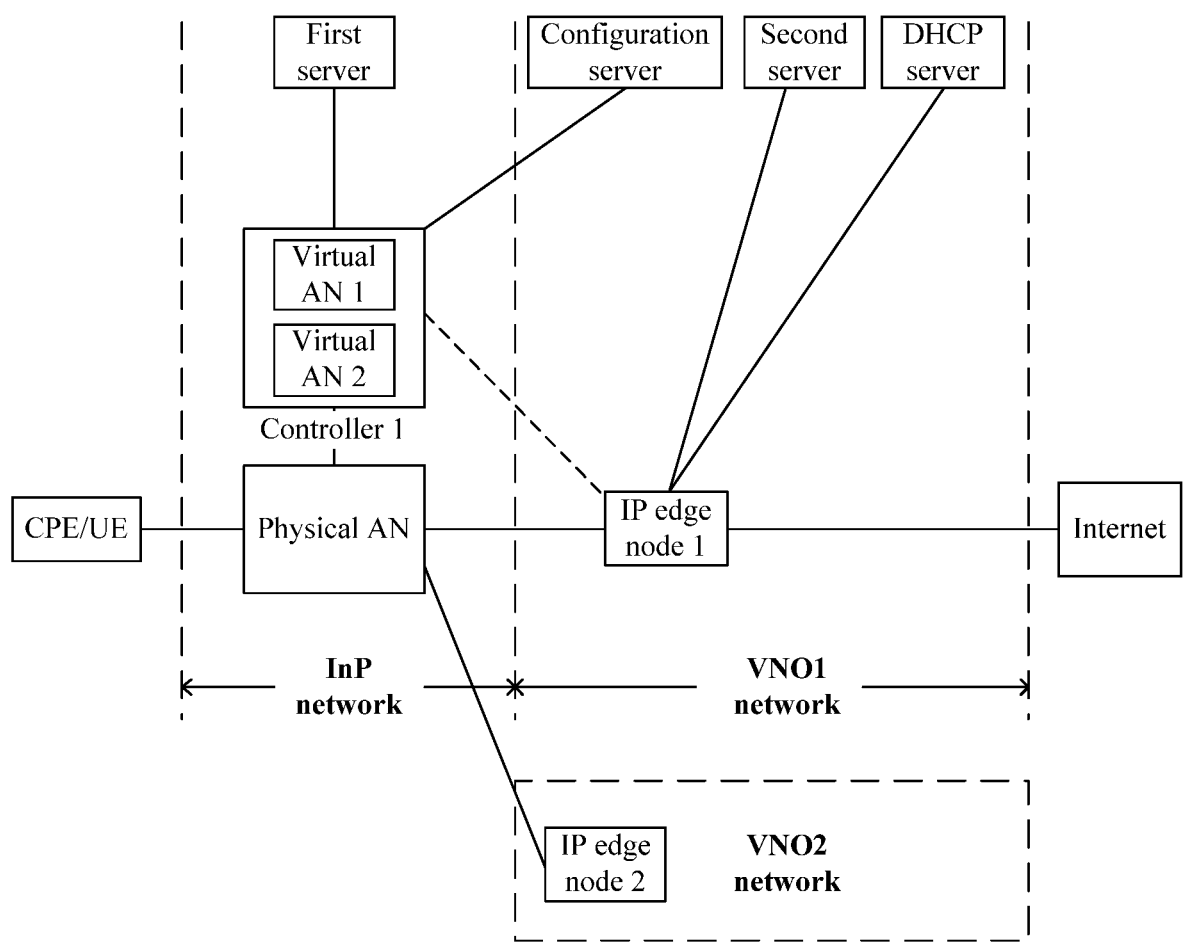
FIG. 12 is a schematic diagram of a network architecture to which an embodiment 5 of the invention is applied.

A network architecture to which an embodiment 5 according to embodiments of the invention is applied is shown in FIG. 12. A control plane and a forwarding plane of a physical AN are separated, a function of the control plane of the physical AN is integrated into a controller 1, and the physical AN is virtualized on the controller 1. The controller 1 supports presentation of different virtual ANs and virtual lines to different VNOs, and the different virtual ANs and virtual lines may be controlled by the different VNOs. The physical AN is virtualized to two virtual ANs, that is, a virtual AN 1 and a virtual AN 2, on the controller 1. CPE/UE accesses a VNO1 network by using the virtual AN 1, and the CPE/the UE accesses a VNO2 network by using the virtual AN 2. In the network architecture shown in FIG. 7, the controller 1 is separately connected to configuration servers in the VNO1 network and the VNO2 network. An IP edge node 1 is separately connected to a second server and a DHCP server in the VNO1 network. An IP edge node 2 is separately connected to a second server and a DHCP server in the VNO2 network. In this embodiment, the controller 1 establishes the virtual AN, that is, the virtual AN 1 and the virtual AN 2, corresponding to a virtual line.

A process of establishing a virtual access node in an optical access network in this embodiment is described, by using an example in which the virtual AN 1 is established, from the perspective that network elements interact with each other by using different protocols. A process of establishing the virtual AN 2 is similar to the process of establishing the virtual AN 1, and in this embodiment, the process of establishing the virtual AN 2 is not described again by using examples one by one.

Figure 13A:
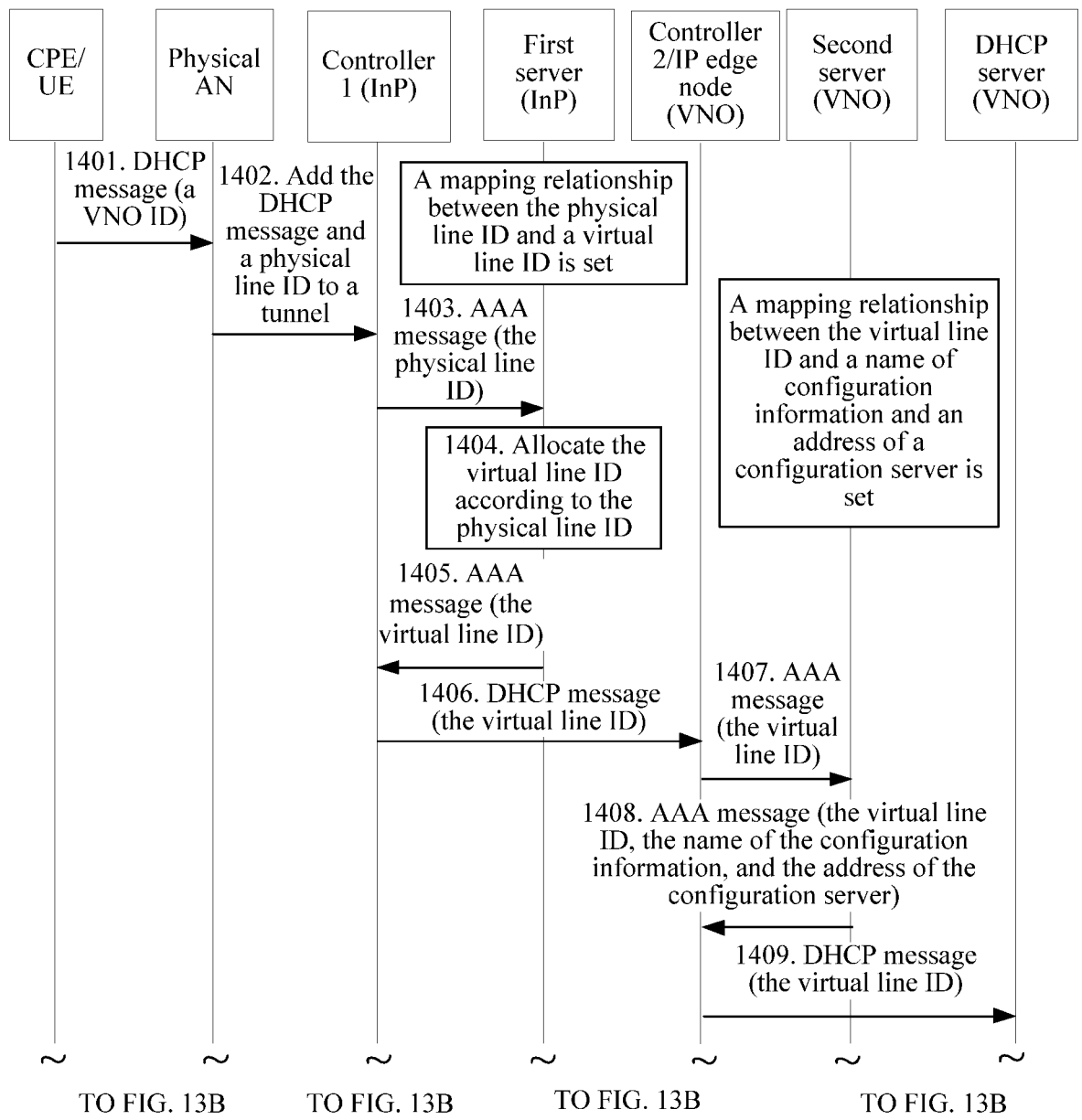
FIG. 13A and FIG. 13B show a schematic flowchart of a method according to an embodiment 5 of the invention.
Figure 13B:
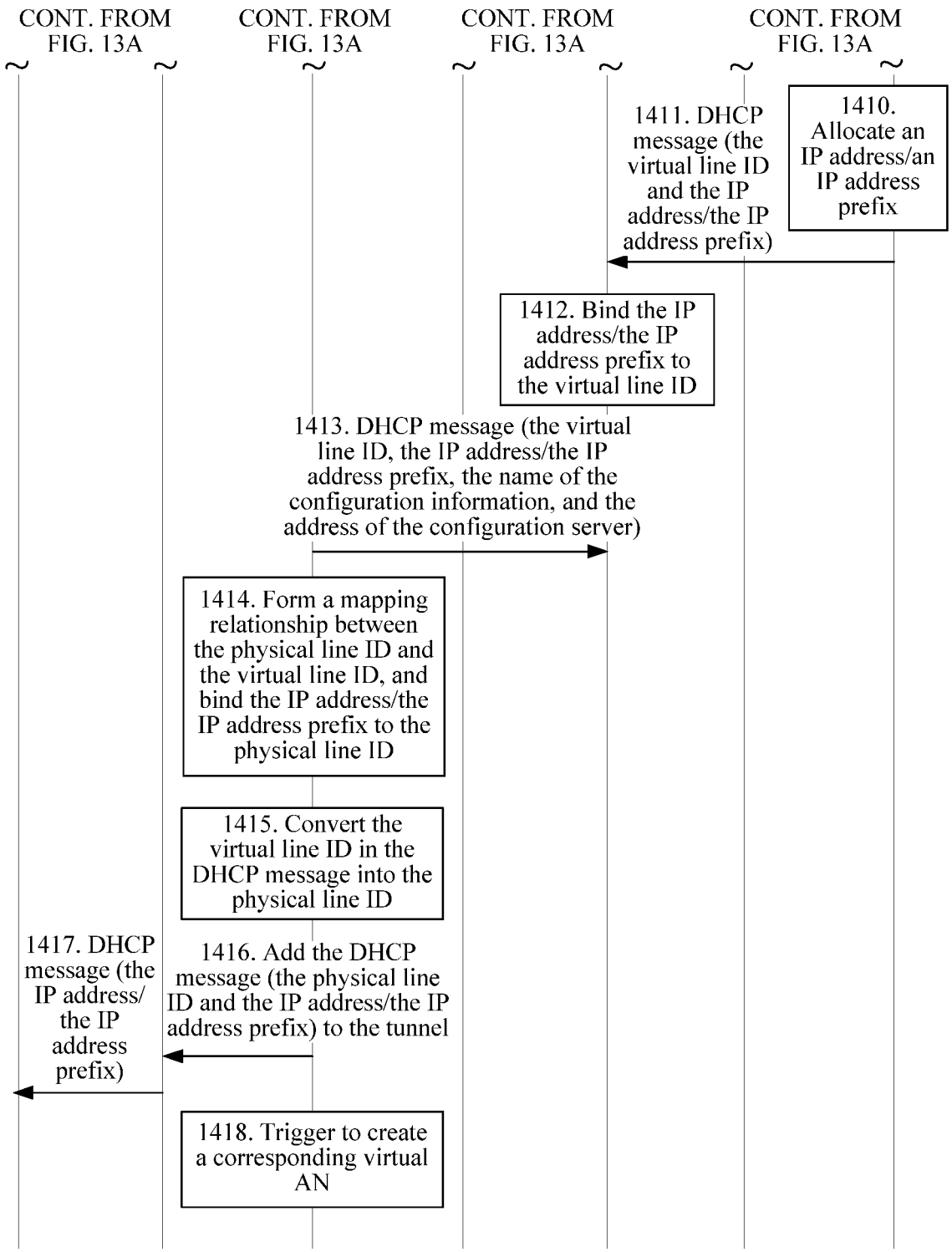

1. The DHCP is used between the network elements. A specific process is as follows, as shown in FIG. 13A and FIG. 13B:

For details of 1401 to 1405, refer to related descriptions of 1001 to 1005 in the embodiment shown in FIG. 9.

For 1406 to 1415, respectively refer to related descriptions of 605 to 614 in the embodiment shown in FIG. 5A and FIG. 5B, and a difference between this embodiment and the embodiment shown in FIG. 5 is that this embodiment is performed by the controller 1, but the embodiment shown in FIG. 5A and FIG. 5B is performed by the physical AN.

For 1416 to 1418, refer to related descriptions of 1013 to 1015 in the embodiment shown in FIG. 9.

Figure 14:
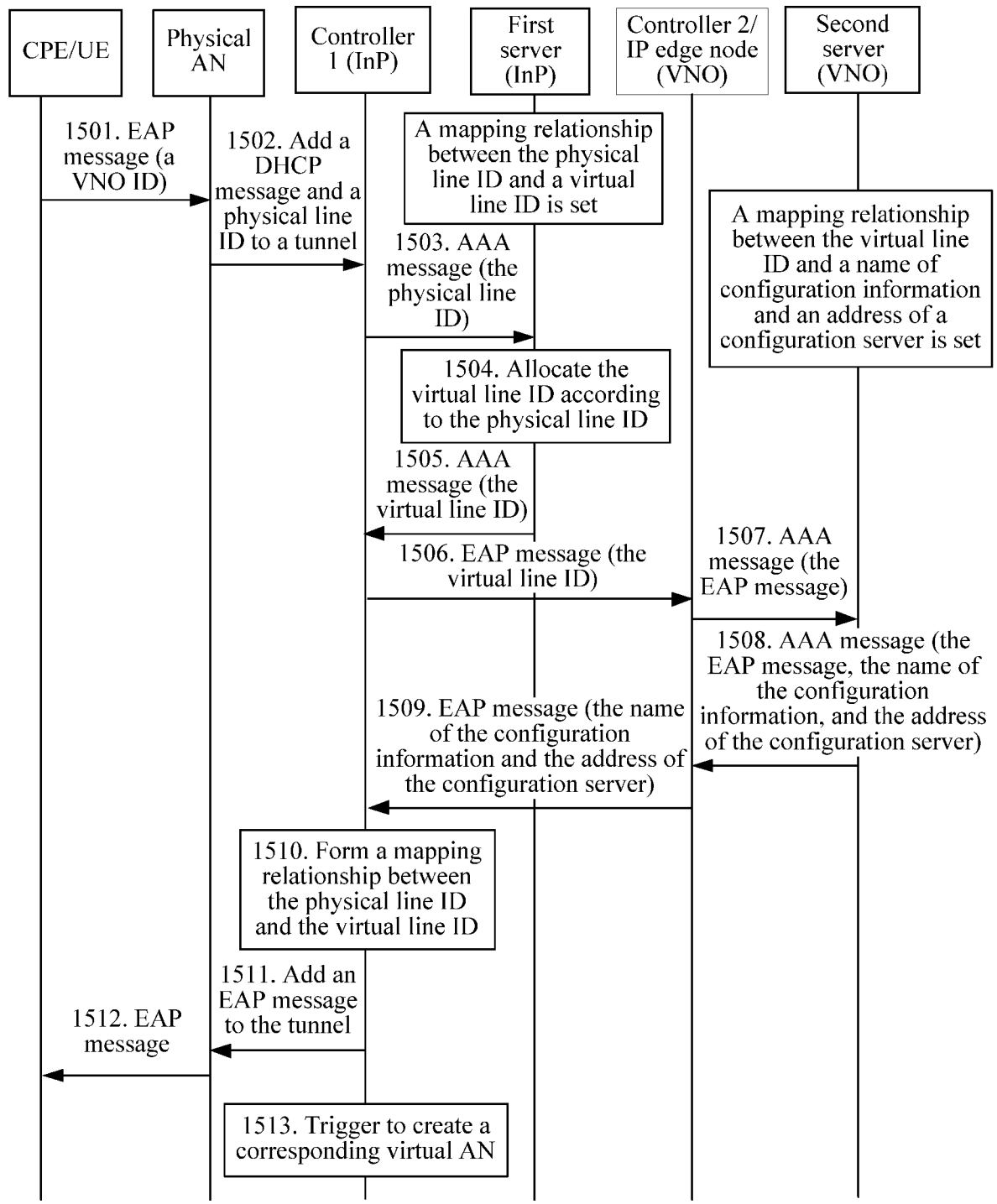
FIG. 14 is another schematic flowchart of the method according to an embodiment 5 of the invention.

2. The EAP is used between the network elements. A specific process is as follows, as shown in FIG. 14:

For details of 1501 to 1505, refer to related descriptions of 1101 to 1105 in the embodiment shown in FIG. 10.

For details of 1506 to 1510, refer to related descriptions of 705 to 709 in the embodiment shown in FIG. 6, and a difference between this embodiment and the embodiment shown in FIG. 6 is that this embodiment is performed by the controller 1, but the embodiment shown in FIG. 6 is performed by the physical AN.

For details of 1511 to 1513, refer to related descriptions of 1109 to 1111 in the embodiment shown in FIG. 10.

In the embodiments shown in FIG. 13A and FIG. 13B and FIG. 14, for details of a process in which the controller 1 triggers to create the corresponding virtual AN, refer to a related description in the embodiment shown in FIG. 11.

Figure 15:
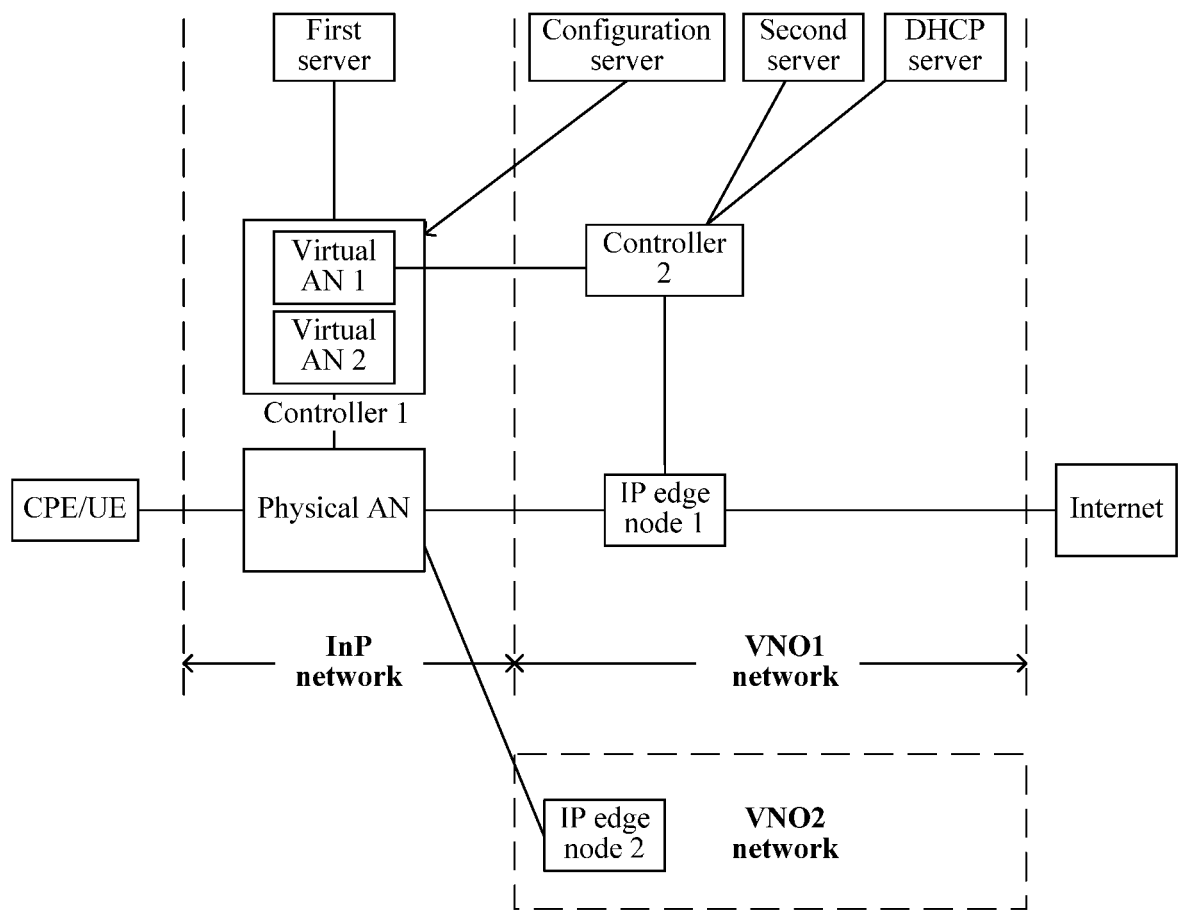
FIG. 15 is a schematic diagram of a network architecture to which an embodiment 6 of the invention is applied.

A network architecture to which an embodiment 6 according to embodiments of the invention is applied is shown in FIG. 15. A control plane and a forwarding plane of a physical AN are separated, a function of the control plane of the physical AN is integrated into a controller 1, and the physical AN is virtualized on the controller 1. The controller 1 supports presentation of different virtual ANs and virtual lines to different VNOs, and the different virtual ANs and virtual lines may be controlled by the different VNOs. The physical AN is virtualized to two virtual ANs, that is, a virtual AN 1 and a virtual AN 2, on the controller 1. CPE/UE accesses a VNO1 network by using the virtual AN 1, and the CPE/the UE accesses a VNO2 network by using the virtual AN 2. A function of a control plane of an IP edge node 1 is integrated into a controller 2. In the network architecture shown in FIG. 15, the controller 1 is separately connected to configuration servers in the VNO1 network and the VNO2 network. The controller 2 is separately connected to a second server and a DHCP server in the VNO1 network. The virtual AN 1 is connected to the controller 2. In this embodiment, the controller 1 establishes the virtual AN, that is, the virtual AN 1 and the virtual AN 2, corresponding to a virtual line.

In this embodiment, if the DHCP is used between the network elements, for details of a process of establishing a virtual access node in an optical access network provided in this embodiment, refer to a description in the embodiment shown in FIG. 13A and FIG. 13B. The controller 2 performs the operation of the IP edge node 1.

In this embodiment, if the EAP is used between the network elements, for details of a process of establishing a virtual access node in an optical access network provided in this embodiment, refer to a description in the embodiment shown in FIG. 14. The controller 2 performs the operation of the IP edge node 1.

A processing procedure of the foregoing method may be implemented by using a software program, the software program may be stored in a storage medium, and when the stored software program is invoked, the foregoing method is performed.

Figure 16:
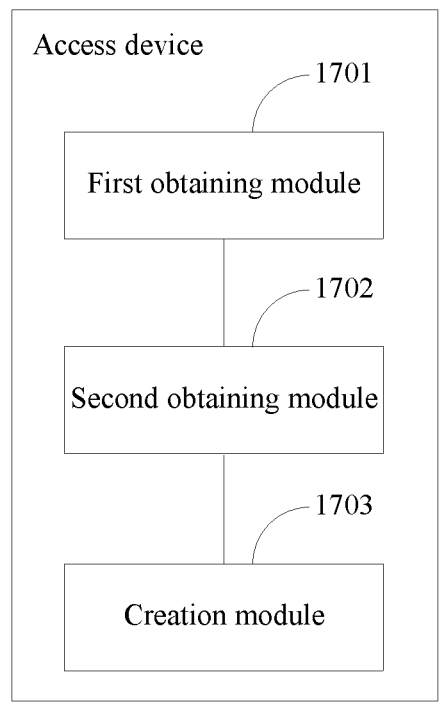
FIG. 16 is a schematic diagram of an access device according to an embodiment 7 of the invention.

Based on a same invention idea, in an embodiment 7 of the invention, an access device is provided, and the access device is applied to a first network. For implementation of the access device provided in this embodiment, refer to a related description in the embodiment shown in FIG. 2. As shown in FIG. 16, the access device includes:

a first obtaining module 1701, configured to obtain an identifier of a virtual line corresponding to a physical line after receiving a first message from user equipment, where the physical line is a physical line between the user equipment and a physical access node AN in the first network, and the virtual line is a logical line between the user equipment and a virtual AN;

a second obtaining module 1702, configured to obtain configuration information from a configuration server in a second network according to the identifier of the virtual line, where the configuration information is used to create the virtual AN; and a creation module 1703, configured to create the virtual AN according to the configuration information.

In an optional implementation, the first obtaining module 1701 is specifically configured to:

send a second message to a first server in the first network, where the second message includes an identifier of the physical line; and receive the identifier of the virtual line that is sent by the first server.

In another optional implementation, the first obtaining module 1701 is specifically configured to:

obtain the identifier of the virtual line according to a correspondence and an identifier of the physical line, where the correspondence includes the identifier of the physical line and the identifier of the virtual line.

Optionally, the first message further includes an identifier of the second network, and the second obtaining module 1702 is specifically configured to:

send a third message to a second server in the second network according to the identifier of the second network in the first message, where the third message includes the identifier of the virtual line; receive an identifier of the configuration information and address information of the configuration server that are sent by the second server; and obtain, according to the identifier of the configuration information, the configuration information from the configuration server corresponding to the address information.

Figure 17:
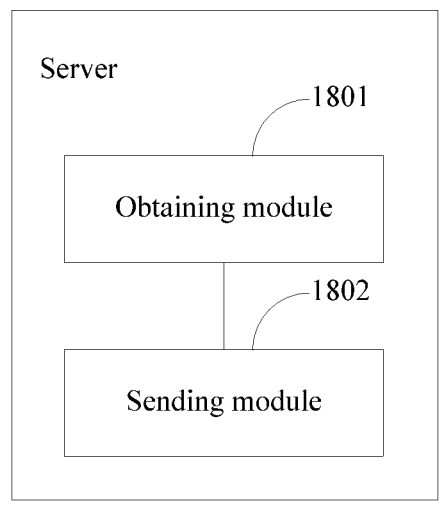
FIG. 17 is a schematic diagram of a server according to an embodiment 8 of the invention.

In an embodiment 8 of the invention, a server is provided, and the server is applied to a second network. For implementation of the server provided in this embodiment, refer to a related description in the embodiment shown in FIG. 3. As shown in FIG. 17, the server includes:

an obtaining module 1801, configured to obtain configuration information according to an identifier of a virtual line, where the virtual line is a logical line between user equipment and a virtual access node AN, and the configuration information is used to create the virtual AN; and a sending module 1802, configured to send the configuration information to an access device in a first network.

In an optional implementation, the obtaining module 1801 is specifically configured to:

receive the identifier of the virtual line that is sent by the access device; and obtain the configuration information according to a first correspondence and the identifier of the virtual line, where the first correspondence includes the configuration information and the identifier of the virtual line.

In another optional implementation, the obtaining module 1801 is specifically configured to:

receive an identifier of the configuration information that is sent by the access device, where the identifier of the configuration information is information obtained according to a second correspondence and the identifier of the virtual line, and the second correspondence includes the identifier of the virtual line and the identifier of the configuration information; and obtain the configuration information according to a third correspondence and the identifier of the configuration information, where the third correspondence includes the configuration information and the identifier of the configuration information.

Figure 18:
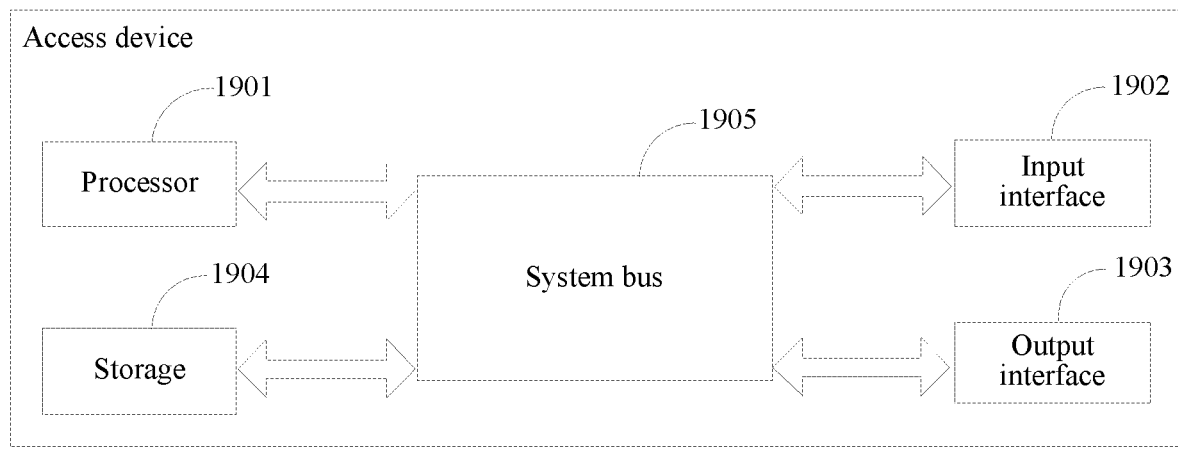
FIG. 18 is a schematic diagram of an access device according to an embodiment 9 of the invention.

In an embodiment 9 of the invention, another access device is provided, and the access device is applied to a first network. As shown in FIG. 18, the access device includes: a processor 1901, an input interface 1902, an output interface 1903, a storage 1904, and a system bus 1905.

The processor 1901 is responsible for logical operations and processing. When a server is running, the processor 1901 reads a program from the storage 1904 and performs the method provided in the embodiment shown in FIG. 2. Specifically:

after the input interface 1902 receives a first message from user equipment, the processor 1901 obtains an identifier of a virtual line corresponding to a physical line, where the physical line is a physical line between the user equipment and a physical access node AN in the first network, and the virtual line is a logical line between the user equipment and a virtual AN; obtains configuration information from a configuration server in a second network according to the identifier of the virtual line, where the configuration information is used to create the virtual AN; and creates the virtual AN according to the configuration information.

The storage 1904 includes a memory and a hard disk, and may store data used by the processor 1901 when the processor 1901 performs an operation. The input interface 1902 is configured to read data under control of the processor 1901, and the output interface 1903 outputs data under control of the processor 1901.

A bus architecture may include any quantity of interconnected buses and bridges. Specifically, various circuits of one or more processors represented by the processor 1901 and memories and hard disks represented by the storage 1904 are connected together. The bus architecture may further connect various other circuits of a peripheral device, a voltage regulator, a power management circuit, and the like. This is well known in the art, and therefore, no further description is provided in this specification.

In an optional implementation, the processor 1901 reads a program from the storage 1904 and specifically performs:

sending a second message to a first server in the first network, where the second message includes an identifier of the physical line; and receiving the identifier of the virtual line that is sent by the first server.

In another optional implementation, the processor 1901 reads a program from the storage 1904 and specifically performs:

obtaining the identifier of the virtual line according to a correspondence and an identifier of the physical line, where the correspondence includes the identifier of the physical line and the identifier of the virtual line.

Optionally, the first message further includes an identifier of the second network, and the processor 1901 reads a program from the storage 1904 and specifically performs:

sending a third message to a second server in the second network according to the identifier of the second network in the first message, where the third message includes the identifier of the virtual line; receiving an identifier of the configuration information and address information of the configuration server that are sent by the second server; and obtaining, according to the identifier of the configuration information, the configuration information from the configuration server corresponding to the address information.

Figure 19:
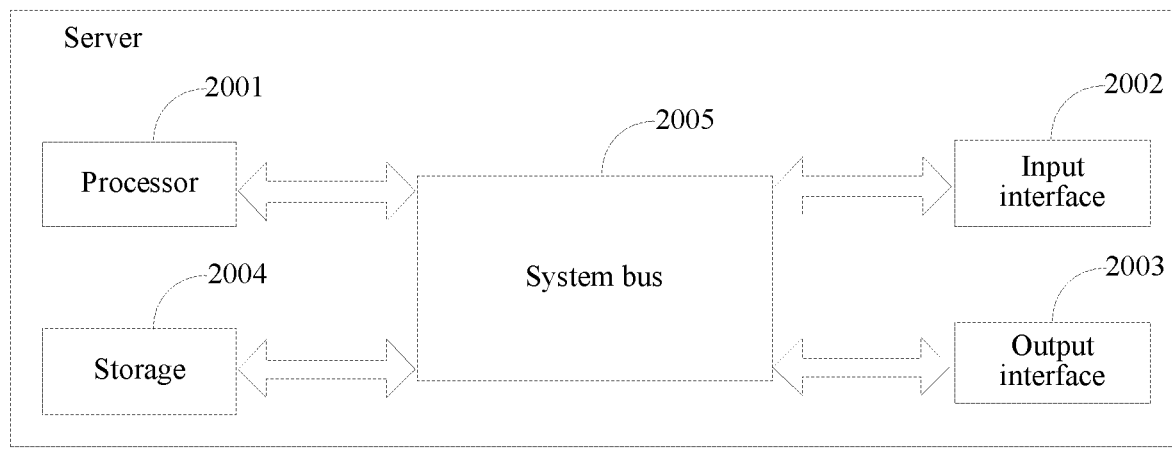
FIG. 19 is a schematic diagram of a server according to an embodiment 10 of the invention.

In an embodiment 10 of the invention, a server is provided, and the server is applied to a second network. As shown in FIG. 19, the server includes:

a processor 2001, an input interface 2002, an output interface 2003, a storage 2004, and a system bus 2005.

The processor 2001 is responsible for logical operations and processing. The processor 2001 reads a program from the storage 2004 and performs the method in the embodiment shown in FIG. 3. Specifically:

the processor 2001 obtains configuration information according to an identifier of a virtual line, where the virtual line is a logical line between user equipment and a virtual access node AN, and the configuration information is used to create the virtual AN; and controls the output interface 2003 to send the configuration information to an access device in a first network.

The storage 2004 includes a memory and a hard disk, and may store data used by the processor 2001 when the processor 2001 performs an operation. The input interface 2002 is configured to read data under control of the processor 2001, and the output interface 2003 outputs data under control of the processor 2001.

A bus architecture may include any quantity of interconnected buses and bridges. Specifically, various circuits of one or more processors represented by the processor 2001 and memories and hard disks represented by the storage 2004 are connected together. The bus architecture may further connect various other circuits of a peripheral device, a voltage regulator, a power management circuit, and the like. This is well known in the art, and therefore, no further description is provided in this specification.

In an optional implementation, the processor 2001 reads a program from the storage 2004 and specifically performs:

receiving, by using the input interface 2002, the identifier of the virtual line that is sent by the access device; and obtaining the configuration information according to a first correspondence and the identifier of the virtual line, where the first correspondence includes the configuration information and the identifier of the virtual line.

In another optional implementation, the processor 2001 reads a program from the storage 2004 and specifically performs:

receiving, by using the input interface 2002, an identifier of the configuration information that is sent by the access device, where the identifier of the configuration information is information obtained according to a second correspondence and the identifier of the virtual line, and the second correspondence includes the identifier of the virtual line and the identifier of the configuration information; and obtaining the configuration information according to a third correspondence and the identifier of the configuration information, where the third correspondence includes the configuration information and the identifier of the configuration information.

Persons skilled in the art should understand that the embodiments of the invention may be provided as a method, a system, or a computer program product. Therefore, the embodiments of the invention may use a form of hardware, software, or a combination of software and hardware. Moreover, the embodiments of the invention may use a form of a computer program product that is implemented on one or more computer-usable storage media (including but not limited to a disk storage, a CD-ROM, an optical storage, and the like) that include a computer-usable program code.

The embodiments of invention are described with reference to the flowcharts and/or block diagrams of the method, the device, system and the computer program product. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable storage that can instruct the computer or any other programmable data processing device to work in a specific manner, so that the instructions stored in the computer readable storage generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Finally, it should be noted that the foregoing embodiments are merely intended for describing the technical solutions of embodiments of the invention as an example other than limiting embodiments of the invention. Although embodiments of the invention and benefits of embodiments of the invention are described in detail with reference to the foregoing embodiments, persons of ordinary skill in the art should understand that they may still make modifications to the technical solutions described in the foregoing embodiments or make equivalent replacements to some technical features thereof, without departing from the scope of the embodiments of the invention.

What is claimed is:

1. A method for establishing a virtual access node in an optical access network, wherein the method comprises:

obtaining, by an access device in a first network, an identifier of a virtual line corresponding to a physical line after receiving a first message comprising an identifier of a second network from a user equipment, wherein the identifier of the virtual line is obtained based on a mapping relationship between the identifier of the virtual line and an identifier of the physical line, wherein the physical line is a physical line between the user equipment and a physical access node (AN) in the first network, and the virtual line is a logical line between the user equipment and a virtual AN coupled to the second network;

obtaining, by the access device in the first network, configuration information from a configuration server in the second network according to the identifier of the virtual line, wherein the configuration information is used to create the virtual AN coupled to the second network; and creating, by the access device in the first network, the virtual AN coupled to the second network according to the configuration information to provide communication between the user equipment and the second network using the virtual AN.

2. The method according to claim 1, wherein the obtaining, by the access device, the identifier of the virtual line corresponding to the physical line comprises:

sending, by the access device, a second message to a first server in the first network, wherein the second message comprises an identifier of the physical line; and receiving, by the access device, the identifier of the virtual line that is sent by the first server.

3. The method according to claim 1, wherein the obtaining, by the access device, the identifier of the virtual line corresponding to the physical line comprises:

obtaining, by the access device, the identifier of the virtual line according to a correspondence and an identifier of the physical line, wherein the correspondence comprises the identifier of the physical line and the identifier of the virtual line.

4. The method according to claim 1, wherein the obtaining, by the access device, the configuration information from the configuration server in the second network according to the identifier of the virtual line comprises:

sending, by the access device, a third message to a second server in the second network according to the identifier of the second network in the first message, wherein the third message comprises the identifier of the virtual line;

receiving, by the access device, an identifier of the configuration information and address information of the configuration server that are sent by the second server; and obtaining, by the access device according to the identifier of the configuration information, the configuration information from the configuration server corresponding to the address information.

5. A method for establishing a virtual access node in an optical access network, wherein the method comprises:

obtaining, by a configuration server in a second network, configuration information according to an identifier of a virtual line that is sent by an access device in a first network after receiving a first message comprising an identifier of the second network from a user equipment, wherein the identifier of the virtual line is determined based on a mapping relationship between the identifier of the virtual line and an identifier of a physical line, wherein the physical line is between the user equipment and a physical access node in the first network, wherein the virtual line is a logical line between the user equipment and a virtual access node (AN) coupled to the second network, and wherein the configuration information is used to create the virtual AN; and sending, by the configuration server, the configuration information to the access device in the first network to create the virtual AN coupled to the second network.

6. The method according to claim 5, wherein the obtaining, by the configuration server in the second network, configuration information according to the identifier of the virtual line comprises:

receiving, by the configuration server, the identifier of the virtual line that is sent by the access device; and obtaining, by the configuration server, the configuration information according to a first correspondence and the identifier of the virtual line, wherein the first correspondence comprises the configuration information and the identifier of the virtual line.

7. The method according to claim 5, wherein the obtaining, by the configuration server in the second network, configuration information according to the identifier of the virtual line comprises:

receiving, by the configuration server, an identifier of the configuration information that is sent by the access device, wherein the identifier of the configuration information is information obtained according to a second correspondence and the identifier of the virtual line, and the second correspondence comprises the identifier of the virtual line and the identifier of the configuration information; and obtaining, by the configuration server, the configuration information according to a third correspondence and the identifier of the configuration information, wherein the third correspondence comprises the configuration information and the identifier of the configuration information.

8. An access device, wherein the access device is applied to a first network, and the access device comprises:

a first obtaining module in the first network configured to obtain an identifier of a virtual line corresponding to a physical line after receiving a first message comprising an identifier of a second network from a user equipment, wherein the identifier of the virtual line is obtained based on a mapping relationship between the identifier of the virtual line and an identifier of the physical line, wherein the physical line is a physical line between the user equipment and a physical access node (AN) in the first network, and the virtual line is a logical line between the user equipment and a virtual AN coupled to the second network;

a second obtaining module in the first network configured to obtain configuration information from a configuration server in the second network according to the identifier of the virtual line, wherein the configuration information is used to create the virtual AN; and a creation module in the first network configured to create the virtual AN coupled to the second network according to the configuration information.

9. The access device according to claim 8, wherein the first obtaining module is configured to:

send a second message to a first server in the first network, wherein the second message comprises an identifier of the physical line; and receive the identifier of the virtual line that is sent by the first server.

10. The access device according to claim 8, wherein the first obtaining module is configured to:

obtain the identifier of the virtual line according to a correspondence and an identifier of the physical line, wherein the correspondence comprises the identifier of the physical line and the identifier of the virtual line.

11. The access device according to claim 8, wherein the first message comprises an identifier of the second network, and the second obtaining module is configured to:

send a third message to a second server in the second network according to the identifier of the second network in the first message, wherein the third message comprises the identifier of the virtual line; receive an identifier of the configuration information and address information of the configuration server that are sent by the second server; and obtain, according to the identifier of the configuration information, the configuration information from the configuration server corresponding to the address information.

\* \* \* \* \*